United States Patent
Li et al.

(10) Patent No.: US 10,757,008 B2
(45) Date of Patent: Aug. 25, 2020

(54) FLOW SPECIFICATION PROTOCOL-BASED COMMUNICATIONS METHOD, DEVICE, AND SYSTEM

(71) Applicant: HUAWEI TECHNOLOGIES CO., LTD., Shenzhen (CN)

(72) Inventors: Zhenbin Li, Beijing (CN); Shunwan Zhuang, Beijing (CN); Xia Chen, Beijing (CN); Nan Wu, Beijing (CN); Qiandeng Liang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 42 days.

(21) Appl. No.: 16/137,817

(22) Filed: Sep. 21, 2018

(65) Prior Publication Data

US 2019/0028381 A1 Jan. 24, 2019

Related U.S. Application Data

(63) Continuation of application No. PCT/CN2017/076960, filed on Mar. 16, 2017.

(30) Foreign Application Priority Data

Mar. 21, 2016 (CN) .......................... 2016 1 0160664

(51) Int. Cl.
*H04L 12/50* (2006.01)
*H04L 12/715* (2013.01)
(Continued)

(52) U.S. Cl.
CPC .......... *H04L 45/04* (2013.01); *H04L 12/4641* (2013.01); *H04L 29/06* (2013.01);
(Continued)

(58) Field of Classification Search
CPC ....................................................... H04L 12/28
(Continued)

(56) References Cited

U.S. PATENT DOCUMENTS

| 7,773,596 | B1 | 8/2010 | Marques |
| 2015/0195105 | A1 | 7/2015 | Zhuang et al. |
| 2018/0351882 | A1* | 12/2018 | Jeganathan ............. H04L 49/70 |

FOREIGN PATENT DOCUMENTS

| CN | 101895480 A | 11/2010 |
| CN | 103139040 A | 6/2013 |

(Continued)

OTHER PUBLICATIONS

W. Hao et al, BGP Flow-Spec Redirect to Tunnel Action draft-hao-idr-flowspec-redirect-tunnel-01.txt, Mar. 18, 2016, 9 pages.
(Continued)

*Primary Examiner* — Dang T Ton
(74) *Attorney, Agent, or Firm* — Kilpatrick Townsend & Stockton LLP

(57) ABSTRACT

Embodiments of the present invention provide a Flow Specification-based communications method, device, and system. The method includes: obtaining, by a controller, a requirement indicating that a first resource on a forwarding device needs to be associated with a second resource on the forwarding device; and sending, by the controller, a Border Gateway Protocol Flow Specification BGP Flow Spec protocol packet according to the requirement, where the BGP Flow Spec protocol packet includes a network layer reachability information field and an extended community attribute field, the network layer reachability information field carries characteristic information of the first resource, the extended community attribute field carries a global identifier GID used to indicate the second resource, and the BGP Flow Spec protocol packet is used to instruct to associate the first resource with the second resource.

27 Claims, 7 Drawing Sheets

(51) Int. Cl.
   *H04L 29/06*  (2006.01)
   *H04L 12/46*  (2006.01)
   *H04L 12/741* (2013.01)
   *H04L 12/713* (2013.01)

(52) U.S. Cl.
   CPC ............ *H04L 45/54* (2013.01); *H04L 45/586* (2013.01); *H04L 45/64* (2013.01); *H04L 69/03* (2013.01)

(58) Field of Classification Search
   USPC .......................................................... 370/329
   See application file for complete search history.

(56) References Cited

FOREIGN PATENT DOCUMENTS

| CN | 103684959 A | 3/2014 |
|----|-------------|--------|
| CN | 103731347 A | 4/2014 |
| CN | 104468348 A | 3/2015 |
| CN | 105119820 A | 12/2015 |
| WO | 2008089305 A2 | 7/2008 |

OTHER PUBLICATIONS

D. Walton et al, Advertisement of Multiple Paths in BGP draft-ietf-idr-add-paths-10, Oct. 24, 2014, 8 pages.

H. Gredler et al, North-Bound Distribution of Link-State and TE Information using BGP draft-ietf-is-distribution-11, Jun. 4, 2015, 45 pages.

G. Van de Velde et al, Flowspec Indirection-id Redirect draft-vandevelde-idr-flowspec-path-redirect-02, Mar. 17, 2016, 10 pages.

K. Lougheed et al, A Border Gateway Protocol (BGP). RFC1105, Jun. 1989, 17 pages.

K. Lougheed et al, A Border Gateway Protocol (BGP). RFC1163, Jun. 1990, 29 pages.

K. Lougheed et al, A Border Gateway Protocol 3 (BGP-3). RFC1267, Oct. 1991, 35 pages.

Y. Rekhter et al, A Border Gateway Protocol 4 (BGP-4). RFC4271, Jan. 2006, 104 pages.

E. Rosen et al, BGP/MPLS IP Virtual Private Networks (VPNs) RFC4364, Feb. 2006, 47 pages.

T. Bates et al, BGP Route Reflection: An Alternative to Full Mesh Internal BGP (IBGP), RFC4456, Apr. 2006, 12 pages.

J. Scudder et al, Capabilities Advertisement with BGP-4. RFC5492, Feb. 2009, 7 pages.

P. Marques et al, Dissemination of Flow Specification Rules. RFC5575, Aug. 2009, 22 pages.

Y. Lucy et al., BGP Flowspec Redirect to UPN RD Extended Community; draft-yong-idr-flowspec-redirect-vpn-rd-00.txt, Mar. 17, 2016, XP015111828, 10 pages.

\* cited by examiner

FLOW SPECIFICATION PROTOCOL-BASED COMMUNICATIONS METHOD, DEVICE, AND SYSTEM

CROSS-REFERENCE TO RELATED APPLICATIONS

This application is a continuation of International Application No. PCT/CN2017/076960, filed on Mar. 16, 2017, which claims priority to Chinese Patent Application No. 201610160664.3, filed on Mar. 21, 2016. The disclosures of the aforementioned applications are hereby incorporated by reference in their entireties.

TECHNICAL FIELD

Embodiments of the present invention relate to the communications field, and more specifically, to a Flow Specification Flow Spec protocol-based communications method, device, and system.

BACKGROUND

The Border Gateway Protocol (Border Gateway Protocol, BGP) is a dynamic routing protocol used between autonomous systems (Autonomous System, AS). Three early released versions are BGP-1 (RFC 1105), BGP-2 (RFC 1163), and BGP-3 (RFC 1267), and are mainly used for exchanging reachability routing information between ASs, constructing a propagation path between AS fields, preventing occurrence of a route loop, and applying some routing policies at an AS level. A currently used version is BGP-4 (RFC 4271). As an actual Internet (Internet) external routing protocol standard, the BGP is widely used between Internet service providers (Internet Service Provider, ISP).

A BGP Flow Specification (Flow Specification, Flow Spec) (RFC 5575) means that a traffic policy is transferred to a BGP Flow Specification peer (peer devices for transferring a BGP Flow Specification route are peers of each other) by transferring a BGP Flow Specification route, and after receiving the BGP Flow Specification route, the BGP Flow Specification peer converts preferable routing corresponding to the BGP Flow Specification route into a traffic control policy of a forwarding plane, to perform traffic control. The BGP Flow Specification route is a BGP route defined in the RFC 5575. Such a BGP Flow Specification route includes a type of BGP network layer reachability information (BGP Flow Spec NLRI) and an extended community attribute. By using the network layer reachability information and the extended community attribute, the BGP Flow Specification route may carry a traffic matching condition and an action performed after traffic matching. The RFC 5575 defines 12 types of commonly used traffic matching rules: a destination address, a source address, an IP protocol number, a port number, a destination port number, a source port number, an ICMP type, an ICMP code, a TCP flag bit, a DSCP, a fragment type, and the like. The 12 types of traffic matching rules are encapsulated in the BGP Flow Specification route, and are used as the network layer reachability information for transfer. The RFC 5575 defines four types of commonly used traffic processing behaviors: traffic discarding, rate limiting, modification to a DSCP value of a packet, and a redirect action (redirect Action). The four types of traffic processing behaviors are encapsulated in the BGP Flow Spec route, and are carried as extended community attributes. The redirect action means guiding a particular data flow to enter a corresponding forwarding channel.

Currently, there are the following six types of redirect actions (redirect Actions) supported by the BGP Flow Spec protocol: redirection to a virtual private network VPN routing and forwarding (VPN routing and forwarding, VRF) table with a route target identifier in an AS-2byte format (redirect AS-2byte), redirection to VRF table with a route target identifier in an IPv4 address format (redirect IPv4 format), redirection to VRF table with a route target identifier in an AS-4byte format (redirect AS-4byte), redirection to VRF table with a route target identifier in an IPv6 address format (redirect IPv6 specific AS), redirection to an IPv4 next hop (redirect IPv4 address), and redirection to an IPv6 next hop (redirect IPv6 address).

When a related application is extended in a conventional manner, for example, redirection to VRF/an IP/a tunnel (Tunnel), the BGP Flow Spec protocol needs to be patched each time a new service requirement is added. Consequently, the BGP Flow Spec protocol is always changing. For example, in a currently studied BGP Flow Spec Redirect Actions solution, a general path-ID is defined, to guide a data flow to enter a transport layer tunnel corresponding to the path-ID. Therefore, the path-ID needs to be added to an extended community attribute in the BGP Flow Spec protocol, and if necessary, specific information of the tunnel further needs to be carried.

Therefore, if a related application is still extended in the conventional manner, unlimited extension of the BGP Flow Spec protocol is caused.

SUMMARY

Embodiments of the present invention provide a Flow Specification Flow Spec protocol-based communications method and device, so as to effectively avoid unlimited extension of the Flow Spec protocol.

A first aspect provides a Flow Specification Flow Spec protocol-based communication method, including:

obtaining, by a controller, a requirement indicating that a first resource on a forwarding device needs to be associated with a second resource on the forwarding device; and sending, by the controller, a Border Gateway Protocol Flow Specification BGP Flow Spec protocol packet to the forwarding device according to the requirement, where the BGP Flow Spec protocol packet includes a network layer reachability information field and an extended community attribute field, the network layer reachability information field carries characteristic information of the first resource, the extended community attribute field carries a global identifier GID used to indicate the second resource, and the BGP Flow Spec protocol packet is used to instruct to associate the first resource with the second resource.

It should be understood that the characteristic information of the first resource can indicate the first resource.

In this application, both the first resource and the second resource of the forwarding device are information that is stored on the forwarding device and is used to forward a data packet (a data flow). By associating the first resource with the second resource, a data packet can be guided to enter a corresponding forwarding channel. For example, the first resource indicates routing information that is of a first node and that is stored on the forwarding device, and the second resource indicates a routing table that is of a second node and that is stored on the forwarding device. In this case, associating the first resource with the second resource means adding the routing information of the first node to the routing table of the second node. In this way, a data packet from the second node can be guided to enter a forwarding channel of the first node. For another example, the first resource indicates that a source IP address is an IP address of a first node and a destination IP address is an IP address of a second node. Both the IP address of the first node and the IP address of the second node are stored on the forwarding device. The second resource indicates a routing table (a forwarding table) that is of the second node and that is stored on the forwarding device. In this case, associating the first resource with the second resource means forwarding, according to the routing table of the second node, a data packet whose source IP address and destination IP address are consistent with those of the first resource. In this way, a data packet from the first node can also be guided to enter a forwarding channel of the second node.

Therefore, in this application, the network layer reachability information field in the BGP Flow Spec protocol packet carries the characteristic information of the first resource, and the extended community attribute field carries the global identifier GID used to indicate the second resource, so as to instruct the forwarding device to associate the first resource with the second resource, to guide a data flow to enter a corresponding forwarding channel. As described in the foregoing paragraph, the first resource and the second resource carried in the BGP Flow Spec protocol packet may be different resource combinations. Therefore, a plurality of service requirements may be implemented by using the BGP Flow Spec protocol packet in this application. In a conventional technology, the BGP Flow Spec protocol needs to be patched each time a new service requirement is extended, that is, an extended community attribute in the BGP Flow Spec protocol needs to be extended. Consequently, the BGP Flow Spec protocol is always changing. Compared with the conventional technology, the BGP Flow Spec protocol in this application may meet a plurality of service requirements by using a unified packet format, so as to effectively avoid unlimited extension of the extended community attribute in the BGP Flow Spec protocol.

In this application, the GID carried in the extended community attribute field is used to uniquely indicate the second resource in the forwarding device. For example, the controller and the forwarding device store a mapping table, and the mapping table includes a mapping relationship between the second resource and the GID. Therefore, both the controller and the forwarding device can locate the second resource by using the GID. Therefore, in this application, the second resource can be indicated by adding the concise GID to the extended community attribute field in the BGP Flow Spec protocol packet. In this way, signaling overheads can be reduced.

With reference to the first aspect, in a first possible implementation of the first aspect, the communication method further includes:

obtaining, by the controller, a resource stored on the forwarding device, where the resource includes the second resource;

allocating, by the controller, a mapping identifier to the resource stored on the forwarding device; and sending, by the controller, a mapping table to the forwarding device, where the mapping table includes a mapping relationship between the resource stored on the forwarding device and the allocated mapping identifier, where the GID is a mapping identifier allocated by the controller to the second resource.

In this application, the controller collects the resource stored on the forwarding device, allocates the mapping identifier to the resource, and then notifies the forwarding device of the mapping relationship between the resource and the mapping identifier, so that the controller and the forwarding device can locate a corresponding resource by adding only a mapping identifier to communication signaling. Therefore, communication efficiency can be improved, and signaling overheads can also be reduced.

With reference to the first aspect, in a second possible implementation of the first aspect, the extended community attribute field includes a GID field and a flag field, the GID field carries the GID, and the flag filed carries information used to instruct to associate the first resource with the second resource on a control plane of the forwarding device or on a forwarding plane of the forwarding device.

In the conventional technology, an extended application usually guides, only on the forwarding plane, a data flow to enter a corresponding forwarding channel. However, in this application, a data flow not only can be guided on the forwarding plane to enter a corresponding forwarding channel, but also can be guided on the control plane to enter a corresponding forwarding channel. Therefore, flexible service orchestration can be implemented in this application.

With reference to the second possible implementation of the first aspect, in a third possible implementation of the first aspect, the flag filed includes a forwarding plane bit and a control plane bit; and when 0 is assigned to the forwarding plane bit and 1 is assigned to the control plane bit, it indicates that the first resource is to be associated with the second resource on the control plane, and when 1 is assigned to the forwarding plane bit and 0 is assigned to the control plane bit, it indicates that the first resource is to be associated with the second resource on the forwarding plane.

It should be understood that, in the third possible implementation of the first aspect, the forwarding plane bit and the control plane bit in the flag filed may be replaced with a first bit. When 1 is assigned to the first bit, it indicates that the first resource is to be associated with the second resource on the control plane, and when 0 is assigned to the first bit, it indicates that the first resource is to be associated with the second resource on the forwarding plane.

With reference to the third possible implementation of the first aspect, in a fourth possible implementation of the first aspect, the flag filed further includes an additive bit; and when 1 is assigned to the additive bit, it indicates that a resource association relationship is to be added on the forwarding device, and when 0 is assigned to the additive bit, it indicates that an association relationship between the first resource and the second resource is used to replace an original association relationship between the first resource and another resource.

With reference to any one of the second to the fourth possible implementations of the first aspect, in a fifth possible implementation of the first aspect, the forwarding device is a provider edge PE device, a virtual private network VPN instance of a first customer edge CE device is established on the forwarding device, the forwarding device includes routing information of a second CE device, and the routing information of the second CE device is not in a VPN routing table of the VPN instance of the first CE device; and the communication method further includes:

obtaining, by the controller, a VPN service request, where the VPN service request is used to request the first CE device to access the second CE device;

the obtaining, by a controller, a requirement indicating that a first resource on a forwarding device needs to be associated with a second resource on the forwarding device includes:

obtaining, by the controller according to the VPN service request, the requirement indicating that the first resource needs to be associated with the second resource, where the first resource is the routing information of the second CE device, and the second resource is the VPN instance of the first CE device; and the sending, by the controller, a Border Gateway Protocol Flow Specification BGP Flow Spec protocol packet to the forwarding device according to the requirement includes:

sending, by the controller, the BGP Flow Spec protocol packet to the forwarding device according to the requirement, where the flag filed in the BGP Flow Spec protocol packet is used to instruct to associate the first resource with the second resource on the control plane, and the BGP Flow Spec protocol packet is used to instruct to add the routing information of the second CE device to the VPN routing table of the VPN instance of the first CE device.

In this application, the controller delivers the BGP Flow Spec protocol packet to the PE device (that is, the forwarding device), to instruct the PE device to add, to the routing table of the first CE device, the routing information of the second CE device whose VPN RT attribute does not match that of the first CE device, so that a data packet from the first CE device can be guided to enter a forwarding channel of the second CE device, that is, the first CE device accesses the second CE device, where VPN RT attributes of the first CE device and the second CE device do not match. Therefore, compared with a manual configuration manner in the prior art, in this application, VPN communication between two CE devices whose VPN RT attributes do not match can be flexibly and efficiently implemented. In addition, compared with the conventional technology in which a data flow is guided only on the forwarding plane to enter a corresponding forwarding channel, in this application, a data flow can be guided on the control plane to enter a corresponding forwarding channel, so that flexible service orchestration can be implemented.

With reference to the fifth possible implementation of the first aspect, in a sixth possible implementation of the first aspect, the communication method further includes:

obtaining, by the controller from the forwarding device, attribute information of the VPN instance of the first CE device, where the attribute information includes a VPN instance name, a VPN instance route distinguisher RD, a VPN instance route target RT, a VPN instance index value, and VPN instance interface information;

allocating, by the controller, a mapping identifier to the attribute information of the VPN instance of the first CE device, where the mapping identifier uniquely indicates, in the forwarding device, the attribute information of the VPN instance of the first CE device; and sending, by the controller, a mapping table to the forwarding device, where the mapping table includes a mapping relationship between the attribute information of the VPN instance of the first CE device and the mapping identifier, where the GID carried in the GID field is one or more mapping identifiers.

In this application, the controller collects attribute information of a VPN instance established on the PE device, allocates a mapping identifier to the attribute information of the VPN instance, and then notifies the PE device of a mapping relationship between the attribute information of the VPN instance and the mapping identifier, so that the controller and the PE device can locate a corresponding VPN instance by adding only a mapping identifier to a BGP Flow Spec protocol packet. Therefore, communication efficiency can be improved, and signaling overheads can also be reduced.

With reference to the sixth possible implementation of the first aspect, in a seventh possible implementation of the first aspect, the communication method further includes:

obtaining, by the controller, a VPN service request used to request to configure attribute information for a VPN instance that is of a third CE device and that is newly established on the forwarding device; and configuring, by the controller, the following attribute information for the VPN instance of the third CE device: a VPN instance name, a VPN instance RD, a VPN instance RT, and VPN instance interface information, where the following attribute information of the VPN instance of the third CE device does not conflict with the attribute information corresponding to the VPN instance of the first CE device: the VPN instance name, the VPN instance RD, and the VPN instance interface information.

In this application, the controller obtains attribute information of an existing VPN instance on the PE device, so that a conflict between attribute information of different VPN instances can be avoided when the controller configures attribute information for a VPN instance added on the PE device. Compared with the prior art in which a conflict is avoided by means of planning, in this application, a conflict can be effectively avoided, and operation efficiency is relatively high.

With reference to any one of the fifth to the seventh possible implementations of the first aspect, in an eighth possible implementation of the first aspect, a VPN instance of the second CE device is established on the forwarding device, and a VPN routing table of the VPN instance of the second CE device includes the routing information of the second CE device; and the characteristic information of the first resource is at least one piece of the following attribute information of the VPN instance of the second CE device: a VPN instance name, a VPN instance RD, a VPN instance index value, VPN instance interface information, or a VPN instance GID.

With reference to any one of the fifth to the seventh possible implementations of the first aspect, in a ninth possible implementation of the first aspect, a VPN instance of the second CE device is not established on the forwarding device, and a VPN public-network routing table of the forwarding device includes the routing information of the second CE device; and the characteristic information of the first resource is at least one piece of the following information: RD information, export target Export Target information, or route prefix information that is corresponding to the routing information of the second CE device.

With reference to any one of the second to the fourth possible implementations of the first aspect, in a tenth possible implementation of the first aspect, the forwarding device is a provider edge PE device, a virtual private network VPN instance of a first customer edge CE device and a VPN instance of a third CE device are established on the forwarding device, the forwarding device further includes routing information of a second CE device, a VPN routing table of the VPN instance of the first CE device does not include the routing information of the second CE device, and a VPN routing table of the VPN instance of the third CE device includes the routing information of the second CE device; and the communication method further includes:

obtaining, by the controller, a VPN service request, where the VPN service request is used to request the first CE device to access the second CE device;

the obtaining, by a controller, a requirement indicating that a first resource on a forwarding device needs to be associated with a second resource on the forwarding device includes:

obtaining, by the controller according to the VPN service request, the requirement indicating that the first resource needs to be associated with the second resource, where a source IP address of the first resource is an IP address of the first CE device, a destination IP address of the first resource is an IP address of the second CE device, and the second resource is the VPN instance of the third CE device; and the sending, by the controller, a BGP Flow Spec protocol packet to the forwarding device according to the requirement includes:

sending, by the controller, the BGP Flow Spec protocol packet to the forwarding device according to the requirement, where the flag filed in the BGP Flow Spec protocol packet is used to instruct to associate the first resource with the second resource on the forwarding plane, and the BGP Flow Spec protocol packet is used to instruct to forward, according to the routing information that is of the second CE device and that is included in the VPN routing table of the VPN instance of the third CE device, a data packet whose source IP address and destination IP address are consistent with those of the first resource.

It should be understood that, in this implementation, the characteristic information of the first resource is that a source IP address is the IP address of the first CE device, and a destination IP address is the IP address of the second CE device.

In this application, the controller delivers the BGP Flow Spec protocol packet to the PE device (that is, the forwarding device), to instruct the PE device to forward, according to a forwarding table of the second CE device whose VPN RT attribute does not match that of the first CE device, the data packet whose source IP address is the IP address of the first CE device and whose destination IP address is the IP address of the second CE device, so that a data packet from the first CE device can be guided to enter a forwarding channel of the second CE device, that is, the first CE device accesses the second CE device, where VPN RT attributes of the first CE device and the second CE device do not match. Therefore, compared with a manual configuration manner in the prior art, in this application, VPN communication between two CE devices whose VPN RT attributes do not match can be flexibly and efficiently implemented.

With reference to the tenth possible implementation of the first aspect, in an eleventh possible implementation of the first aspect, the communication method further includes:

obtaining, by the controller from the forwarding device, attribute information of the VPN instance of the third CE device, where the attribute information includes a VPN instance name, a VPN instance route distinguisher RD, a VPN instance route target RT, a VPN instance index value, and VPN instance interface information;

allocating, by the controller, a mapping identifier to the attribute information of the VPN instance of the third CE device, where the mapping identifier uniquely indicates, in the forwarding device, the attribute information of the VPN instance of the third CE device; and sending, by the controller, a mapping table to the forwarding device, where the mapping table includes a mapping relationship between the attribute information of the VPN instance of the third CE device and the mapping identifier, where the GID carried in the GID field is one or more mapping identifiers.

In this application, the controller collects attribute information of a VPN instance established on the PE device, allocates a mapping identifier to the attribute information of the VPN instance, and then notifies the PE device of a mapping relationship between the attribute information of the VPN instance and the mapping identifier, so that the controller and the PE device can locate a corresponding VPN instance by adding only a mapping identifier to a BGP Flow Spec protocol packet. Therefore, communication efficiency can be improved, and signaling overheads can also be reduced.

With reference to the eleventh possible implementation of the first aspect, in a twelfth possible implementation of the first aspect, the communication method further includes:

obtaining, by the controller, a VPN service request used to request to configure attribute information for a VPN instance that is of a fourth CE device and that is newly established on the forwarding device; and configuring, by the controller, the following attribute information for the VPN instance of the fourth CE device: a VPN instance name, a VPN instance RD, a VPN instance RT, and VPN instance interface information, where the following attribute information of the VPN instance of the fourth CE device does not conflict with attribute information corresponding to the VPN instance of the first CE device and the attribute information corresponding to the VPN instance of the third CE device: the VPN instance name, the VPN instance RD, and the VPN instance interface information.

In this application, the controller obtains attribute information of an existing VPN instance on the PE device, so that a conflict between attribute information of different VPN instances can be avoided when the controller configures attribute information for a VPN instance added on the PE device. Compared with the prior art in which a conflict is avoided by means of planning, in this application, a conflict can be effectively avoided, and operation efficiency is relatively high.

With reference to any one of the tenth to the twelfth possible implementations of the first aspect, in a thirteenth possible implementation of the first aspect, the second CE device is the third CE device.

A second aspect provides a Flow Specification Flow Spec protocol-based communication method, where the communication method includes:

receiving, by a forwarding device, a Border Gateway Protocol Flow Specification BGP Flow Spec protocol packet sent by a controller, where the BGP Flow Spec protocol packet includes a network layer reachability information field and an extended community attribute field, the network layer reachability information field carries characteristic information, of a first resource, that is used to indicate the first resource on the forwarding device, the extended community attribute field carries a global identifier GID used to indicate a second resource on the forwarding device, and the BGP Flow Spec protocol packet is used to instruct to associate the first resource with the second resource;

obtaining, by the forwarding device, the first resource according to the characteristic information of the first resource, and obtaining the second resource according to the GID; and associating, by the forwarding device, the first resource with the second resource.

In this application, both the first resource and the second resource of the forwarding device are information that is stored on the forwarding device and is used to forward a data packet (a data flow). By associating the first resource with the second resource, a data packet can be guided to enter a corresponding forwarding channel. For example, the first resource indicates routing information that is of a first node and that is stored on the forwarding device, and the second resource indicates a routing table that is of a second node and that is stored on the forwarding device. In this case, associating the first resource with the second resource means adding the routing information of the first node to the routing table of the second node. In this way, a data packet from the second node can be guided to enter a forwarding channel of the first node. For another example, the first resource indicates that a source IP address is an IP address of a first node and a destination IP address is an IP address of a second node. Both the IP address of the first node and the IP address of the second node are stored on the forwarding device. The second resource indicates a routing table (a forwarding table) that is of the second node and that is stored on the forwarding device. In this case, associating the first resource with the second resource means forwarding, according to the routing table of the second node, a data packet whose source IP address and destination IP address are consistent with those of the first resource. In this way, a data packet from the first node can also be guided to enter a forwarding channel of the second node.

Therefore, in this application, the network layer reachability information field in the BGP Flow Spec protocol packet carries the characteristic information of the first resource, and the extended community attribute field carries the global identifier GID used to indicate the second resource, so as to instruct the forwarding device to associate the first resource with the second resource, to guide a data flow to enter a corresponding forwarding channel. As described in the foregoing paragraph, the first resource and the second resource carried in the BGP Flow Spec protocol packet may be different resource combinations. Therefore, a plurality of service requirements may be implemented by using the BGP Flow Spec protocol packet in this application. In a conventional technology, the BGP Flow Spec protocol needs to be patched each time a new service requirement is extended, that is, an extended community attribute in the BGP Flow Spec protocol needs to be extended. Consequently, the BGP Flow Spec protocol is always changing. Compared with the conventional technology, the BGP Flow Spec protocol in this application may meet a plurality of service requirements by using a unified packet format, so as to effectively avoid unlimited extension of the extended community attribute in the BGP Flow Spec protocol.

In this application, the GID carried in the extended community attribute field is used to uniquely indicate the second resource in the forwarding device. For example, the controller and the forwarding device store a mapping table, and the mapping table includes a mapping relationship between the second resource and the GID. Therefore, both the controller and the forwarding device can locate the second resource by using the GID. Therefore, in this application, the second resource can be indicated by adding the concise GID to the extended community attribute field in the BGP Flow Spec protocol packet. In this way, signaling overheads can be reduced.

With reference to the second aspect, in a first possible implementation of the second aspect, the extended community attribute field includes a GID field and a flag field, the GID field carries the GID, and the flag filed carries information used to instruct to associate the first resource with the second resource on a control plane of the forwarding device or on a forwarding plane of the forwarding device.

In the conventional technology, an extended application usually guides, only on the forwarding plane, a data flow to enter a corresponding forwarding channel. However, in this application, a data flow not only can be guided on the forwarding plane to enter a corresponding forwarding channel, but also can be guided on the control plane to enter a corresponding forwarding channel. Therefore, flexible service orchestration can be implemented in this application.

With reference to the first possible implementation of the second aspect, in a second possible implementation of the second aspect, the flag filed includes a forwarding plane bit and a control plane bit; and when 0 is assigned to the forwarding plane bit and 1 is assigned to the control plane bit, it indicates that the first resource is to be associated with the second resource on the control plane, and when 1 is assigned to the forwarding plane bit and 0 is assigned to the control plane bit, it indicates that the first resource is to be associated with the second resource on the forwarding plane.

It should be understood that, in the foregoing implementation, the forwarding plane bit and the control plane bit in the flag filed may be replaced with a first bit. When 1 is assigned to the first bit, it indicates that the first resource is to be associated with the second resource on the control plane, and when 0 is assigned to the first bit, it indicates that the first resource is to be associated with the second resource on the forwarding plane.

With reference to the first or the second possible implementation of the second aspect, in a third possible implementation of the second aspect, the forwarding device is a provider edge PE device, a virtual private network VPN instance of a first customer edge CE device is established on the forwarding device, the forwarding device includes routing information of a second CE device, and the routing information of the second CE device is not in a VPN routing table of the VPN instance of the first CE device; and the receiving, by a forwarding device, a BGP Flow Spec protocol packet sent by the controller includes:

receiving, by the forwarding device, the BGP Flow Spec protocol packet sent by the controller according to a VPN service request, where the VPN service request is used to request the first CE device to access the second CE device, the first resource is the routing information of the second CE device, the second resource is the VPN instance of the first CE device, the flag filed in the BGP Flow Spec protocol packet is used to instruct to associate the first resource with the second resource on the control plane, and the BGP Flow Spec protocol packet is used to instruct to add the routing information of the second CE device to the VPN routing table of the VPN instance of the first CE device; and the associating, by the forwarding device, the first resource with the second resource includes:

adding, by the forwarding device, the routing information of the second CE device to the VPN routing table of the VPN instance of the first CE device.

In this application, the PE device (that is, the forwarding device) receives the BGP Flow Spec protocol packet delivered by the controller, and to adds, to the routing table of the first CE device, the routing information of the second CE device whose VPN RT attribute does not match that of the first CE device, so that a data packet from the first CE device can be guided to enter a forwarding channel of the second CE device, that is, the first CE device accesses the second CE device, where VPN RT attributes of the first CE device and the second CE device do not match. Therefore, compared with a manual configuration manner in the prior art, in this application, VPN communication between two CE devices whose VPN RT attributes do not match can be flexibly and efficiently implemented. In addition, compared with the conventional technology in which a data flow is guided only on the forwarding plane to enter a corresponding forwarding channel, in this application, a data flow can be guided on the control plane to enter a corresponding forwarding channel, so that flexible service orchestration can be implemented.

With reference to the third implementation of the second aspect, in a fourth possible implementation of the second aspect, the communication method further includes:

sending, by the forwarding device, attribute information of the VPN instance of the first CE device to the controller, where the attribute information includes a VPN instance name, a VPN instance route distinguisher RD, a VPN instance route target RT, a VPN instance index value, and VPN instance interface information; and receiving, by the forwarding device, a mapping table sent by the controller, where the mapping table includes a mapping relationship between the attribute information of the VPN instance of the first CE device and a mapping identifier that is allocated by the controller to the attribute information of the VPN instance of the first CE device, and the mapping identifier uniquely indicates, in the forwarding device, the attribute information of the VPN instance of the first CE device, where the GID carried in the GID field is one or more mapping identifiers.

In this application, the controller collects attribute information of a VPN instance established on the PE device, allocates a mapping identifier to the attribute information of the VPN instance, and then notifies the PE device of a mapping relationship between the attribute information of the VPN instance and the mapping identifier, so that the controller and the PE device can locate a corresponding VPN instance by adding only a mapping identifier to a BGP Flow Spec protocol packet. Therefore, communication efficiency can be improved, and signaling overheads can also be reduced.

With reference to the third or the fourth implementation of the second aspect, in a fifth possible implementation of the second aspect, a VPN instance of the second CE device is established on the forwarding device, and a VPN routing table of the VPN instance of the second CE device includes the routing information of the second CE device;

the characteristic information of the first resource is at least one piece of the following attribute information of the VPN instance of the second CE device: a VPN instance name, a VPN instance RD, a VPN instance index value, VPN instance interface information, or a VPN instance GID; and the obtaining, by the forwarding device, the first resource according to the characteristic information of the first resource includes:

obtaining, by the forwarding device from the VPN routing table of the VPN instance of the second CE device, the routing information of the second CE device according to the characteristic information of the first resource.

In the foregoing implementation, the characteristic information of the first resource is used to indicate a GID of the VPN instance of the second CE device.

With reference to the third or the fourth implementation of the second aspect, in a sixth possible implementation of the second aspect, a VPN instance of the second CE device is not established on the forwarding device, and a VPN public-network routing table of the forwarding device includes the routing information of the second CE device;

the characteristic information of the first resource is at least one piece of the following information: RD information, export target Export Target information, or route prefix information that is corresponding to the routing information of the second CE device; and the obtaining, by the forwarding device, the first resource according to the characteristic information of the first resource includes:

obtaining, by the forwarding device from the VPN public-network routing table, the routing information of the second CE device according to the characteristic information of the first resource.

With reference to the first or the second implementation of the second aspect, in a seventh possible implementation of the second aspect, the forwarding device is a provider edge PE device, a virtual private network VPN instance of a first customer edge CE device and a VPN instance of a third CE device are established on the forwarding device, the forwarding device further includes routing information of a second CE device, a VPN routing table of the VPN instance of the first CE device does not include the routing information of the second CE device, and a VPN routing table of the VPN instance of the third CE device includes the routing information of the second CE device; and the receiving, by a forwarding device, a BGP Flow Spec protocol packet sent by the controller includes:

receiving, by the forwarding device, the BGP Flow Spec protocol packet sent by the controller according to a VPN service request, where the VPN service request is used to request the first CE device to access the second CE device, a source IP address of the first resource is an IP address of the first CE device, a destination IP address of the first resource is an IP address of the second CE device, the second resource is the VPN instance of the third CE device, the flag filed in the BGP Flow Spec protocol packet is used to instruct to associate the first resource with the second resource on the forwarding plane, and the BGP Flow Spec protocol packet is used to instruct to forward, according to the routing information that is of the second CE device and that is included in the VPN routing table of the VPN instance of the third CE device, a data packet whose source IP address and destination IP address are consistent with those of the first resource; and the associating, by the forwarding device, the first resource with the second resource includes:

receiving, by the forwarding device, the data packet, where the source IP address of the data packet is the IP address of the first CE device, and the destination IP address of the data packet is the IP address of the second CE device; and forwarding, by the forwarding device, the data packet according to the routing information that is of the second CE device and that is included in the VPN routing table of the VPN instance of the third CE device.

It should be understood that, in this implementation, the characteristic information of the first resource is that a source IP address is the IP address of the first CE device, and a destination IP address is the IP address of the second CE device.

In this application, the PE device (that is, the forwarding device) receives the BGP Flow Spec protocol packet delivered by the controller, and forwards, according to a forwarding table of the second CE device whose VPN RT attribute does not match that of the first CE device, the data packet whose source IP address is the IP address of the first CE device and whose destination IP address is the IP address of the second CE device, so that a data packet from the first CE device can be guided to enter a forwarding channel of the second CE device, that is, the first CE device accesses the second CE device, where VPN RT attributes of the first CE device and the second CE device do not match. Therefore, compared with a manual configuration manner in the prior art, in this application, VPN communication between two CE devices whose VPN RT attributes do not match can be flexibly and efficiently implemented.

With reference to the seventh implementation of the second aspect, in an eighth possible implementation of the second aspect, the communication method further includes:

sending, by the forwarding device, attribute information of the VPN instance of the third CE device to the controller, where the attribute information includes a VPN instance name, a VPN instance route distinguisher RD, a VPN instance route target RT, a VPN instance index value, and VPN instance interface information; and receiving, by the forwarding device, a mapping table sent by the controller, where the mapping table includes a mapping relationship between the attribute information of the VPN instance of the third CE device and a mapping identifier that is allocated by the controller to the attribute information of the VPN instance of the third CE device, and the mapping identifier uniquely indicates, in the forwarding device, the attribute information of the VPN instance of the third CE device, where the GID carried in the GID field is one or more mapping identifiers.

In this application, the controller collects attribute information of a VPN instance established on the PE device, allocates a mapping identifier to the attribute information of the VPN instance, and then notifies the PE device of a mapping relationship between the attribute information of the VPN instance and the mapping identifier, so that the controller and the PE device can locate a corresponding VPN instance by adding only a mapping identifier to a BGP Flow Spec protocol packet. Therefore, communication efficiency can be improved, and signaling overheads can also be reduced.

With reference to the seventh or the eighth implementation of the second aspect, in a ninth possible implementation of the second aspect, the second CE device is the third CE device.

In some of the foregoing implementations, the controller allocates a mapping identifier to the attribute information of the VPN instance of the first CE device. The controller may separately allocate a mapping identifier to all attribute information (a VPN instance name, a VPN instance route distinguisher RD, a VPN instance route target RT, a VPN instance index value, and VPN instance interface information) of the VPN instance of the first CE device, or may allocate one unified mapping label to all attribute information of the VPN instance of the first CE device, provided that the controller and the PE device can locate the VPN instance of the first CE device by using the mapping label.

A third aspect provides a controller, and the controller is configured to perform the method in any one of the first aspect or the possible implementations of the first aspect.

Specifically, the controller may include a module configured to perform the method in any one of the first aspect or the possible implementations of the first aspect.

A fourth aspect provides a forwarding device, and the forwarding device is configured to perform the method in any one of the second aspect or the possible implementations of the second aspect.

Specifically, the forwarding device may include a module configured to perform the method in any one of the second aspect or the possible implementations of the second aspect.

A fifth aspect provides a controller, where the controller includes a memory and a processor, the memory is configured to store an instruction, and the processor is configured to execute the instruction stored in the memory, and executes the instruction stored in the memory, so that the processor performs the method in any one of the first aspect or the possible implementations of the first aspect.

A sixth aspect provides a forwarding device, where the forwarding device includes a memory and a processor, the memory is configured to store an instruction, and the processor is configured to execute the instruction stored in the memory, and executes the instruction stored in the memory, so that the processor performs the method in any one of the second aspect or the possible implementations of the second aspect.

A seventh aspect provides a Flow Specification Flow Spec-based communications system, where the communications system includes a controller and a forwarding device, the controller is the controller according to the third aspect, and the forwarding device is the forwarding device according to the fourth aspect.

In some of the foregoing implementations, the VPN instance of the first CE device is a VPN instance that is established on the PE device and that can keep in association with the first CE device.

In some of the foregoing implementations, an export target Export Target attribute of the routing information of the second CE device does not match an import target Import Target attribute of the VPN instance of the first CE device.

In some of the foregoing implementations, the routing information of the second CE device indicates IPv4 address information or IPv6 address information of the second CE device.

Therefore, in this application, the network layer reachability information field in the BGP Flow Spec protocol packet carries the characteristic information of the first resource, and the extended community attribute field carries the global identifier GID used to indicate the second resource, so as to instruct the forwarding device to associate the first resource with the second resource, to guide a data flow to enter a corresponding forwarding channel. Compared with the conventional technology, the BGP Flow Spec protocol in this application may meet a plurality of service requirements by using a unified packet format, so as to effectively avoid unlimited extension of the extended community attribute in the BGP Flow Spec protocol. In addition, the second resource can be indicated by adding the concise GID to the extended community attribute field in the BGP Flow Spec protocol packet. In this way, signaling overheads can be reduced.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
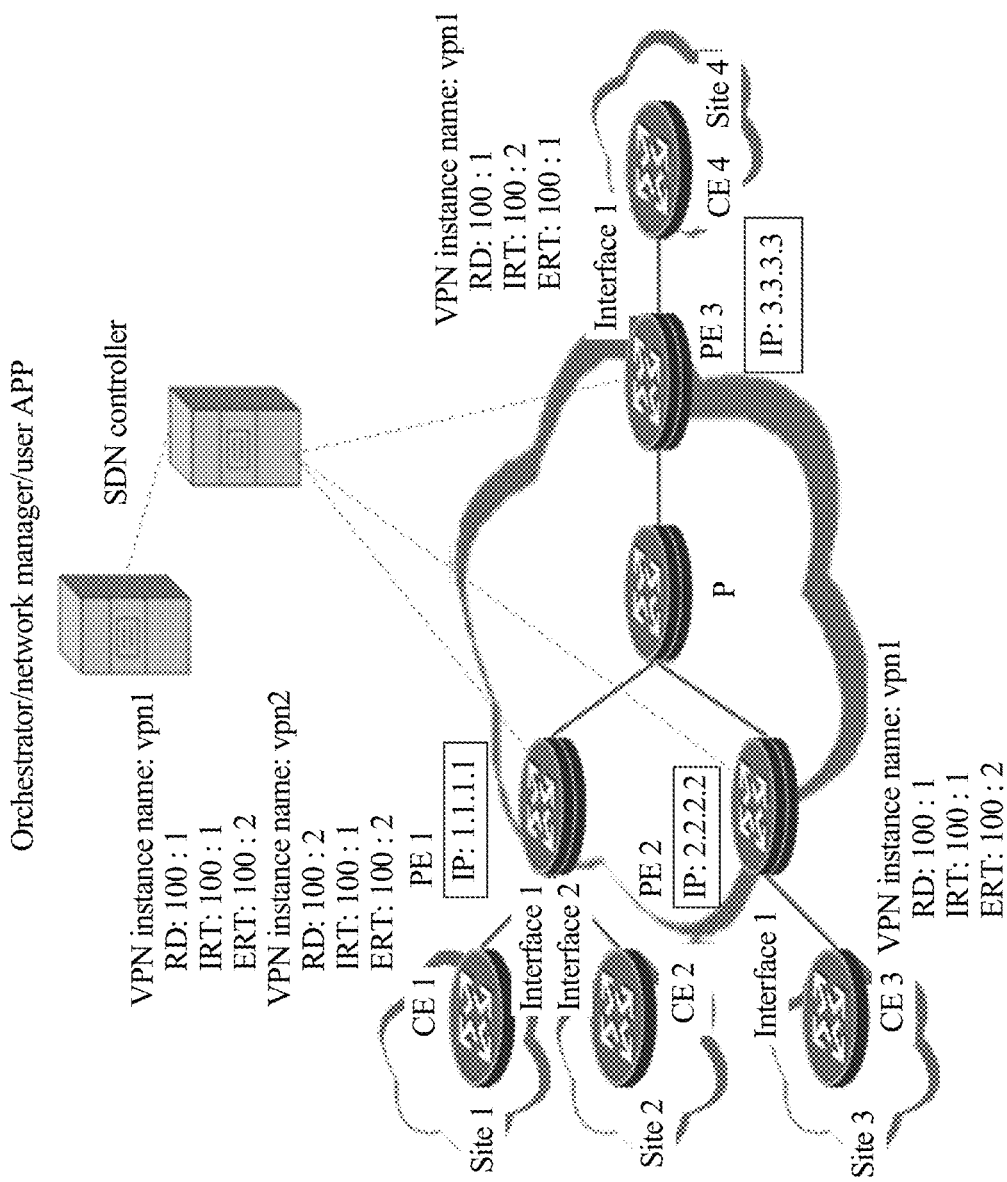
FIG. 1 is a schematic diagram of an application scenario according to an embodiment of the present invention.

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

To easily understand the embodiments of the present invention, some concepts used in description of the embodiments of the present invention are first described herein.

Multiprotocol Label Switching (Multi-Protocol Label Switching, MPLS) is a new-generation IP high-speed backbone network switching standard. Data is forwarded by using a label (Label) in MPLS. When a packet enters a network, a short label of a fixed length is allocated to the packet, and the label and the packet are encapsulated together for forwarding. In an entire forwarding process, a switching node performs forwarding only according to the label. In MPLS, a connection-oriented control plane is added to an IP network that is not connection-oriented, and management and operating means are added for the IP network.

A control plane is a part, in a system, that is used to transfer an instruction and calculate an entry. For example, protocol packet forwarding, and protocol entry calculation, maintenance, and the like all belong to a range of the control plane. For another example, in a routing system, a process that is responsible for managing routing protocol running, route learning, and router entry maintenance belongs to the control plane.

A forwarding plane is a part, in a system, that is used to encapsulate and forward a data packet. For example, receiving, decapsulation, encapsulation, forwarding, and the like of a data packet all belong to a range of the forwarding plane. For another example, after a system receives an IP packet, a process that is responsible for decapsulating the IP packet, searching a routing table according to the IP packet, and forwarding the IP packet from an outbound interface belongs to the forwarding plane.

A BGP Flow Specification (Flow Specification, Flow Spec) (RFC 5575) means that a traffic policy is transferred to a BGP Flow Specification peer (peer devices for transferring a BGP Flow Specification route are peers of each other) by transferring a BGP Flow Specification route, and after receiving the BGP Flow Specification route, the BGP Flow Specification peer converts preferable routing corresponding to the BGP Flow Specification route into a traffic control policy of a forwarding plane, to perform traffic control. The BGP Flow Specification route is a BGP route defined in the RFC 5575. Such a BGP Flow Specification route includes a type of BGP network layer reachability information (BGP Flow Spec NLRI) and an extended community attribute. By using the network layer reachability information and the extended community attribute, the BGP Flow Specification route may carry a traffic matching condition and an action performed after traffic matching. The RFC 5575 defines 12 types of commonly used traffic matching rules: a destination address, a source address, an IP protocol number, a port number, a destination port number, a source port number, an ICMP type, an ICMP code, a TCP flag bit, a DSCP, a fragment type, and the like. The 12 types of traffic matching rules are encapsulated in the BGP Flow Specification route, and are used as the network layer reachability information for transfer. The RFC 5575 defines four types of commonly used traffic processing behaviors: traffic discarding, rate limiting, modification to a DSCP value of a packet, and redirection to a VPN. The four types of traffic processing behaviors are encapsulated in the BGP Flow Spec route, and are carried as extended community attributes.

In some cases, many departments of a large organization are distributed at some places relatively far from each other, and each place has a private network. Assuming that these private networks distributed at different places need to frequently communicate with each other, a private network of the organization may be implemented by using the Internet (that is, a public Internet). Therefore, such a private network is referred to as a virtual private network (Virtual Private Network, VPN).

Currently, a typical VPN is a BGP/MPLS IP VPN, and the BGP/MPLS IP VPN is also usually referred to as an MPLS L3VPN. A basic model of the MPLS L3VPN includes three parts: a CE, a PE, and a P.

The CE is a customer edge device (Customer Edge), and the CE has an interface that is directly connected to a service provider (Service Provider, SP) network. The CE may be a router or a switch, or may be a host. Generally, the CE cannot "perceive" a VPN, and does not need to support MPLS.

The PE is a provider edge device (Provider Edge) and is an edge device of a service provider network. The PE is directly connected to a CE, and is responsible for VPN service access and VPN-IPv4 route processing. One PE device may be connected to a plurality of CE devices. One CE device may be connected to a plurality of PE devices that belong to a same service provider or different service providers.

The P is a backbone device in a service provider network and is not directly connected to a CE.

A VPN instance (VPN-instance) is a dedicated entity that is established and maintained by a PE device for a CE device that is directly connected to the PE device. Each CE device has a VPN instance on a PE device that is directly connected to the CE device. The VPN instance is also referred to as a VPN routing and forwarding (VPN Routing and Forwarding table, VRF) table. Content of VRF table includes an IP routing table, a label forwarding table, an interface that uses the label forwarding table, and management information (such as a route filtering policy and a member interface list). Each VPN instance is included in a routing table and a forwarding table of one or more CE devices that are directly connected to the PE.

A PE device has a plurality of routing and forwarding tables, including one public network routing and forwarding table and one or more VPN routing and forwarding tables (also referred to as private network routing and forwarding tables). A public network routing table includes IPv4 routes of all PE devices, and is generated by using a routing protocol of a backbone network or a static route of a backbone network. A public network forwarding table is minimum forwarding information extracted from the public network routing table according to a route management policy. A VPN routing table of a VPN instance includes routes of all CE devices that belong to the VPN instance, and is obtained by means of VPN routing information exchange between a CE device and a PE device or between two PE devices. For example, the VPN routing table includes a route obtained from a CE device corresponding to the VPN instance, or may include a route introduced by using an MP-iBGP route. A VPN forwarding table is minimum forwarding information extracted from a corresponding VPN routing table according to a route management policy.

A site (site) is a group of IP systems between which there is IP connectivity, and the IP connectivity of the group of IP systems does not need to be implemented by using a service provider. Sites are classified according to a network topology relationship between devices instead of a geographical location. Devices at a site are usually neighboring in terms of geographical location, but if two groups of IP systems separated in terms of geographical location are interconnected by using a dedicated line, and can communicate with each other without using a service provider, the two groups of IP systems constitute a site. A site is connected to a service provider (Service Provider, SP) network by using a customer edge device (Customer Edge, CE).

A relationship between a VPN, a site, and a VPN instance is as follows: A VPN is a combination of a plurality of sites. One site may belong to a plurality of VPNs. Each site is associated with a VPN instance on a PE device. A VPN instance integrates a VPN membership and a routing rule of the VPN instance. A plurality of sites are combined to form one VPN according to the routing rule of the VPN instance.

A route distinguisher (Route Distinguisher, RD) is a flag indicating a VPN instance to which an IP route belongs and is globally unique with 8 bytes, and is used to differentiate different VPNs that use an IP address prefix (for example, an IPv4 prefix or an IPv6 prefix) in a same address space. Independence of a VPN in an address space is implemented by using an RD. A structure of an RD enables each service provider to allocate an RD independently. There is a one-to-one correspondence between an RD and a VPN routing and forwarding (VRF) table. Generally, a same RD is allocated to VRF table corresponding to interfaces that are on different PE devices but belong to a same VPN instance. In other words, a globally unique RD is allocated to each VPN instance.

An IPv4 address to which an RD is added is referred to as a VPN-IPv4 address. For example, after a PE device receives an IPv4 address of a CE device from the CE device directly connected to the PE device, the PE device converts the IPv4 address into a globally unique VPN-IPv4 address by adding an RD, and publishes the VPN-IPv4 address on a public network. A structure of VPN-IPv6 address is similar to that of VPN-IPv4 address, except that an IPv4 prefix is replaced with an IPv6 prefix.

A BGP/MPLS IP VPN uses a VPN target (VPN Target) attribute to control publishing of VPN routing information. Generally, the VPN target attribute is also referred to as a route target (Route Target, RT) attribute. The BGP/MPLS IP VPN uses two types of RT attributes: an export target and an import target.

Export target (Export Target, ERT): After a PE device learns of an IPv4 route from a CE device directly connected to the PE device, the PE device converts the IPv4 route into a VPN-IPv4 route by adding an RD, sets an export target attribute for the VPN-IPv4 route, and then publishes, by using a public network to another PE device, the VPN-IPv4 route for which the export target attribute is set. The export target attribute is published as a BGP extended community attribute along with a BGP Flow Spec route.

Import target (Import Target, IRT): When receiving a VPN-IPv4 route published by another PE device by using a public network, a local PE device checks an export target attribute of the VPN-IPv4 route. When the export target attribute of the VPN-IPv4 route matches an import target attribute of a VPN instance on the local PE device, the local PE device adds the VPN-IPv4 route to a VPN routing table of the VPN instance. Each VPN instance may be associated with one or more RT attributes.

Before a local PE publishes, to another PE, a VPN-IPv4 route learned of from a CE directly connected to the local PE, the local PE sets an export target attribute for the route, and publishes the export target attribute as an extended community attribute along with a Flow Spec route. When receiving a VPN-IPv4 route published by another PE, a PE checks an export target attribute of the VPN-IPv4 route, and only when the export target attribute of the VPN-IPv4 route matches an import target attribute of a VPN instance on the PE, the PE adds the VPN-IPv4 route to VRF table corresponding to the VPN instance. That is, the RT attribute defines a specific site at which a VPN-IPv4 route can be received, and a specific site at which a route that can be received by a PE is sent.

It should be understood that, the RT attribute is also applicable to publishing control of a VPN route between different VPN instances on a same PE, that is, a same import target and export target may be set for different VPN instances on a same PE, to implement mutual introduction of a VPN route between different VPN instances.

The publication of VPN routing information is: from a local CE device to an ingress PE device (the local CE device is directly connected to the ingress PE device), from the ingress PE device to an egress PE device, and from the egress PE device to a remote CE device (the remote CE device is directly connected to the egress PE device). A general procedure is as follows: The ingress PE device learns of IPv4 routing information from the local CE device, adds an RD and a VPN target attribute to a standard IPv4 route to form a VPN-IPv4 route, and stores the VPN-IPv4 route to a VPN instance created for the CE device. It should be understood that, the IPv4 routing information of the local CE device may be directly configured on the ingress PE device, or may be obtained by the ingress PE device by using another method. The ingress PE publishes the VPN-IPv4 route to the egress PE device by using MP-BGP. The egress PE device compares an export target attribute of the VPN-IPv4 route with an import target attribute of a VPN instance maintained by the egress PE device, to determine whether to add the VPN-IPv4 route to a VPN routing table of a VPN instance maintained by the egress PE device. Connectivity between the ingress PE device and the egress PE device may be ensured by using IGP. When the export target attribute of the VPN-IPv4 route matches an import target attribute of a VPN instance maintained by the egress PE device, the egress PE device adds the VPN-IPv4 route to a VPN routing table of the VPN instance. The remote CE device learns of, from the egress PE device, an IPv4 route corresponding to the VPN-IPv4 route. The remote CE may learn of a VPN route from the egress PE device in a plurality of route manners, for example, in a static route manner, a RIP manner, an OSPF manner, an IS-IS manner, or a BGP manner. This process may be the same as a process of VPN routing information exchange between the local CE device and the ingress PE device. After route exchange among the three parts is completed, a reachable route is established between the local CE device and the remote CE device, so as to ensure that VPN private-network routing information can be transferred on a backbone network.

For ease of understanding and description, a virtual private network VPN scenario is used as an example for description below. Correspondingly, a PE device is used as an example of a forwarding device. However, embodiments of the present invention are not limited thereto. It can be clearly understood by a person skilled in the art according to the description of the embodiments of the present invention that, a method in the embodiments of the present invention may also be applied to other scenarios related to guiding a data flow to enter a corresponding forwarding channel. Such applications all fall within the scope of the present invention.

FIG. 1 shows a specific application scenario of an embodiment of the present invention. A PE 1, a PE 2, and a PE 3 are three PE devices deployed with a VPN service. IP addresses of the PE 1, the PE 2, and the PE 3 are 1.1.1.1, 2.2.2.2, and 3.3.3.3. For example, in a network shown in FIG. 1, the IP address 2.2.2.2 can represent the PE 2. A controller (such as a software-defined networking (Software Define Network, SDN) controller shown in FIG. 1) receives a VPN service request of user equipment (such as an orchestrator/a network manager/a user APP shown in FIG. 1), and delivers signaling to a PE device according to the VPN service request, to implement a VPN service requested by a user.

FIG. 1 provides four sites as an example. A site 1 is connected to the PE 1 by using a CE 1, and the PE 1 keeps in association with the CE 1 by establishing a VPN instance vpn1 on the PE 1. A site 2 is connected to the PE 1 by using a CE 2, and the PE 1 keeps in association with the CE 2 by establishing a VPN instance vpn2 on the PE 1. A site 3 is connected to the PE 2 by using a CE 3, and the PE 2 keeps in association with the CE 3 by establishing a VPN instance vpn1 on the PE 2. A site 4 is connected to the PE 3 by using a CE 4, and the PE 3 keeps in association with the CE 4 by establishing a VPN instance vpn1 on the PE 3.

Attribute information of the VPN instance vpn1 that is established on the PE 1 and that is associated with the CE 1 is as follows:
VPN-Instance Name: vpn1
RD: 100:1
Import Target (IRT for short): 100:1
Export Target (ERT for short): 100:2
VPN interface (Interface): interface 1 (such as an interface 1 on the PE 1 shown in FIG. 1)
VPN index (VPN-Index): 101 (not shown in FIG. 1)
Attribute information of the VPN instance vpn2 that is established on the PE 1 and that is associated with the CE 2 is as follows:
VPN-Instance Name: vpn2
RD: 100:2
IRT: 100:1
ERT: 100:2
Interface: interface 2 (such as an interface 2 on the PE 1 shown in FIG. 1)
VPN-Index: 102 (not shown in FIG. 1)
Attribute information of the VPN instance vpn1 that is established on the PE 2 and that is associated with the CE 3 is as follows:
VPN-Instance Name: vpn1
RD: 100:1
IRT: 100:1
ERT: 100:2
Interface: interface 1 (such as an interface 1 on the PE 2 shown in FIG. 1)
VPN-Index: 201 (not shown in FIG. 1)
Attribute information of the VPN instance vpn1 that is established on the PE 3 and that is associated with the CE 4 is as follows:
VPN-Instance Name: vpn1
RD: 100:1
IRT: 100:2
ERT: 100:1
Interface: interface 1 (such as an interface 1 on the PE 3 shown in FIG. 1)
VPN-Index: 301 (not shown in FIG. 1)

It should be understood that a name of a VPN instance (such as vpn1 and vpn2 shown in FIG. 1) makes sense only on a PE device on which the VPN instance is located. Although a VPN instance vpn1 is established on each of the PE 1/2/3, it does not mean that all the VPN instances belong to one VPN. Whether the VPN instances belong to one VPN is determined by a matching relationship between an import target configured for each VPN instance and an export target configured for each VPN instance. For example, in FIG. 1, an import target and an export target configured for the VPN instance vpn1 on the PE 1 match an export target and an import target configured for the VPN instance vpn1 on the PE 3. The VPN instances may provide a VPN service, because the VPN instances belong to one VPN. However, the import target and the export target configured for the VPN instance vpn1 on the PE 1 do not match an export target and an import target configured for the VPN instance vpn1 on the PE 2. The VPN instances cannot provide a VPN service, because the VPN instances do not belong to one VPN.

For brevity, description of "the VPN instance of the CE 1" is used to represent "the VPN instance that is established on the PE 1 and that is associated with the CE 1", and similar description is also applicable to the CE 2, the CE 3, and the CE 4.

It can be learned from the above that, RT attributes (that is, an IRT and an ERT) of the respective VPN instances of the CE 1, the CE 2, and the CE 3 separately match an RT attribute of the VPN instance of the CE 4. Therefore, respective IPv4 routing information of the CE 1, the CE 2, and the CE 3 may be introduced by the PE 3 into a VPN routing and forwarding (VRF) table of the VPN instance of the CE 4, and IPv4 routing information of the CE 4 may also be separately introduced into VRF table of the VPN instances of the CE 1, the CE 2, and the CE 3. That is, the CE 1 and the CE 4 may access each other, the CE 2 and the CE 4 may access each other, and the CE 3 and the CE 4 may access each other. However, the RT attributes of the respective VPN instances of the CE 1, the CE 2, and the CE 3 do not match each other. Therefore, VRF table of the VPN instance of the CE 1 does not include routing information of the CE 2 and the CE 3, VRF table of the VPN instance of the CE 2 does not include routing information of the CE 1 and the CE 3, and VRF table of the VPN instance of the CE 3 does not include routing information of the CE 1 and the CE 2. Therefore, based on a current VPN routing and forwarding table, the CE 1 and the CE 2 cannot access each other, the CE 1 and the CE 3 cannot access each other, and the CE 2 and the CE 3 cannot access each other. For example, when a user makes a VPN service request for implementing mutual access between the CE 1 and the CE 2, the user request cannot be met based on existing VPN deployment.

To resolve the technical problem, in the prior art, mapping relationships between an import target and an export target of the VPN instances respectively associated with the CE 1 and the CE 2 are manually configured, so as to implement mutual access between the CE 1 and the CE 2. However, the manual configuration manner has complex operations and relatively low efficiency.

To resolve the technical problem, embodiments of the present invention propose a Flow Specification Flow Spec-based communication method, so as to flexibly and efficiently implement mutual access between CE devices whose RT attributes do not match, and effectively avoid unlimited extension of the BGP Flow Spec protocol.

Figure 2:
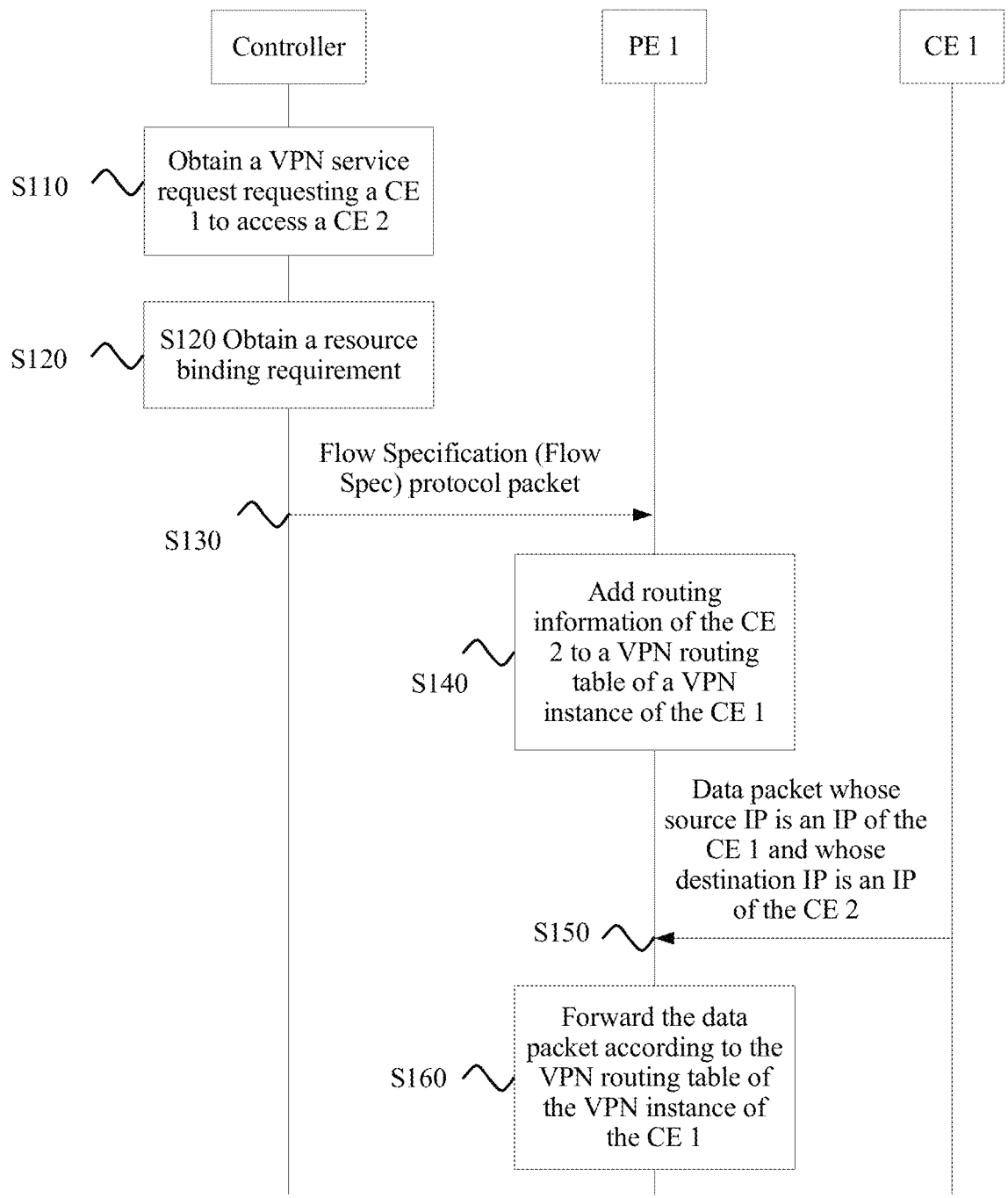
FIG. 2 is a schematic flowchart of a Flow Specification Flow Spec-based communication method according to an embodiment of the present invention.

For ease of understanding and description, network deployment shown in FIG. 1 is used as an example below for describing a Flow Specification Flow Spec-based communication method 100 provided in an embodiment of the present invention. As shown in FIG. 2, the method 100 includes the following steps.

S110. A controller (such as an SDN controller shown in FIG. 1) receives a VPN service request of a user side (such as an orchestrator/a network manager/a user APP shown in FIG. 1), where the VPN service request is used to request a CE 1 to access a CE 2, that is, to guide a data packet from the CE 1 to enter a forwarding channel of the CE 2.

S120. The controller obtains, according to the VPN service request, a requirement indicating that a first resource needs to be associated with a second resource, where the first resource is routing information of the CE 2, and the second resource is a VPN instance of the CE 1.

S130. The controller sends a BGP Flow Spec protocol packet to a PE 1 according to the requirement, where the BGP Flow Spec protocol packet includes a network layer reachability information field and an extended community attribute field, the network layer reachability information field carries characteristic information of the first resource, the extended community attribute field carries a global identifier GID used to indicate the second resource, the characteristic information of the first resource indicates information that can indicate the routing information of the CE 2, and the BGP Flow Spec protocol packet is used to instruct to add the routing information of the CE 2 to VRF table of the VPN instance of the CE 1.

S140. After receiving the BGP Flow Spec protocol packet delivered by the controller, the PE 1 parses the BGP Flow Spec protocol packet, to obtain the routing information of the CE 2 according to the characteristic information of the first resource and obtain the VPN instance of the CE 1 according to the GID, and then adds the routing information of the CE 2 to VRF table of the VPN instance of the CE 1.

It should be understood that, in this embodiment of the present invention, the CE 2 that the CE 1 is to access is directly connected to the PE 1. Therefore, the PE 1 may obtain the routing information of the CE 2 by directly communicating with the CE 2. Alternatively, the routing information of the CE 2 may be configured on the PE 1. This is not limited in this embodiment of the present invention.

An access path from the CE 1 to the CE 2 is established by using the foregoing step.

S150. The PE 1 receives, from an interface (Interface) 1, a data packet from the CE 1 that is to access the CE 2, that is, a source IP address of the data packet is an IP address of the CE 1, and a destination IP address of the data packet is an IP address of the CE 2.

S160. The PE 1 searches VRF table of the VPN instance of the CE 1 according to the destination IP address of the data packet, to obtain the routing information of the CE 2, then determines a forwarding egress of the data packet, that is, an Interface 2 of a VPN instance of the CE 2, and forwards the data packet from the interface 2, so that the data packet is transferred to the CE 2, that is, the CE 1 accesses the CE 2.

It should be understood that, if the VPN service request is that the CE 2 needs to access the CE 1, the CE 2 can access the CE 1 only by interchanging locations of the CE 1 and the CE 2 in step S110 to step S160.

In this embodiment of the present invention, the controller delivers the BGP Flow Spec protocol packet to the PE device, to instruct the PE device to add, to a routing table of the first CE device, the routing information of the second CE device whose VPN RT attribute does not match that of the first CE device, so that a data packet from the first CE device can be guided to enter a forwarding channel of the second CE device, that is, the first CE device accesses the second CE device, where VPN RT attributes of the first CE device and the second CE device do not match. Therefore, compared with a manual configuration manner in the prior art, in this application, VPN communication between two CE devices whose VPN RT attributes do not match can be flexibly and efficiently implemented. In addition, compared with a conventional technology in which a data flow is guided only on a forwarding plane to enter a corresponding forwarding channel, in this application, a data flow can be guided on a control plane to enter a corresponding forwarding channel, so that flexible service orchestration can be implemented.

Specifically, in the scenario shown in FIG. 1, the accessed end CE 2 is directly connected to the PE 1, that is, the VPN instance of the CE 2 is established and maintained on the PE 1 device. In this embodiment of the present invention, the characteristic information of the first resource may be information that is stored on the PE 1 and that is related to the VPN instance of the CE 2. Specifically, the characteristic information of the first resource may be one or more pieces of the following information: a VPN instance name, an RD, an RT, a VPN index, a VPN interface, an IP address prefix, or a MAC address that is of the CE 2. When the characteristic information of the first resource includes a plurality of pieces of the information, there may be an "and/or" relationship between the plurality of pieces of information.

Specifically, in this embodiment of the present invention, the GID that is carried in the extended community attribute field and is used to indicate the second resource may have a mapping relationship with attribute information of the VPN instance of the CE 1.

Optionally, in this embodiment of the present invention, the method 100 further includes the following steps.

S170. The controller separately obtains attribute information of VPN instances maintained on the PE 1, a PE 2, and a PE 3, where the attribute information includes a VPN instance name, a VPN instance route distinguisher RD, a VPN instance route target RT, a VPN instance index value, and VPN instance interface information.

Specifically, the PE 1, the PE 2, and the PE 3 separately report the attribute information of the locally established VPN instances to the controller. Table 1 provides an example of the attribute information of the VPN instances that are separately reported to the controller by the PE 1, the PE 2, and the PE 3.

TABLE 1

| Name of a PE device | Attribute information of a VPN instance on the PE device |
|---|---|
| PE 1 | IP address: 1.1.1.1<br>{<br>VPN-Instance Name: vpn1<br>RD: 100:1<br>IRT: 100:1<br>ERT: 100:2<br>Interface: interface 1<br>VPN-Index: 101<br>},<br>{<br>VPN-Instance Name: vpn2<br>RD: 100:2<br>IRT: 100:1<br>ERT: 100:2<br>Interface: interface 2<br>VPN-Index: 102<br>} |
| PE 2 | IP address: 2.2.2.2<br>{<br>VPN-Instance Name: vpn1<br>RD: 100:1<br>IRT: 100:1<br>ERT: 100:2<br>Interface: interface 1<br>VPN-Index: 201<br>} |
| PE 3 | IP address: 3.3.3.3<br>{<br>VPN-Instance Name: vpn1<br>RD: 100:1<br>IRT: 100:2<br>ERT: 100:1<br>Interface: interface 1<br>VPN-Index: 301<br>} |

It should be understood that, using the PE 2 as an example, the attribute information, such as the VPN-instance name, the RD, the IRT, the ERT, and the interface, of a VPN instance of a CE 3 is configured on the PE 2 by using a command line. The VPN-index is an index value allocated by the PE 2 device to the VPN instance of the CE 3 after the VPN instance of the CE 3 is configured on the PE 2 device. The processing manner is also applicable to the PE 1 and the PE 3. Details are not described herein again.

S180. After obtaining the attribute information of the VPN instances of the PE 1, the PE 2, and the PE 3, the controller allocates a generic identifier (Generic ID, GID) to the attribute information of the VPN instance on each PE device.

Specifically, the GID is specific to each PE device. For example, Table 2 provides an example of a case in which the controller allocates the GID to the attribute information of the VPN instance on the PE 1, Table 3 provides an example of a case in which the controller allocates the GID to the attribute information of the VPN instance on the PE 2, and Table 4 provides an example of a case in which the controller allocates the GID to the attribute information of the VPN instance on the PE 3.

It can be learned from Table 2, Table 3, and Table 4 that, in a PE device, GIDs allocated by the controller are in a one-to-one correspondence with all attribute information of each VPN instance. It should be understood that, Table 2, Table 3, and Table 4 are merely examples, and are not intended for limitation. For example, for the PE 1, the controller may allocate one unified GID, such as 20, to all attribute information of the VPN instance of the CE 1, and allocate one unified GID, such as 30, to all attribute information of the VPN instance of the CE 2.

TABLE 2

| PE 1: 1.1.1.1 | |
|---|---|
| GID | Attribute information of a VPN instance |
| 1 | VPN-Instance Name: vpn1 |
| 2 | RD of vpn1: 100:1 |
| 3 | IRT of vpn1: 100:1 |
| 4 | ERT of vpn1: 100:2 |
| 5 | Interface of vpn1: interface 1 |
| 6 | VPN-Index of vpn1: 101 |
| 7 | VPN-Instance Name: vpn2 |
| 8 | RD of vpn2: 100:2 |
| 9 | IRT of vpn2: 100:1 |
| 10 | ERT of vpn2: 100:2 |
| 11 | Interface of vpn2: interface 2 |
| 12 | VPN-Index of vpn2: 102 |

TABLE 3

| PE 2: 2.2.2.2 | |
|---|---|
| GID | Resource description |
| 1 | VPN-Instance Name: vpn1 |
| 2 | RD of vpn1: 100:1 |
| 3 | IRT of vpn1: 100:1 |
| 4 | ERT of vpn1: 100:2 |
| 5 | Interface of vpn1: interface 1 |
| 6 | VPN-Index of vpn1: 201 |

TABLE 4

| PE 3: 3.3.3.3 | |
|---|---|
| GID | Resource description |
| 1 | VPN-Instance Name: vpn1 |
| 2 | RD of vpn1: 100:1 |
| 3 | IRT of vpn1: 100:2 |
| 4 | ERT of vpn1: 100:1 |
| 5 | Interface of vpn1: interface 1 |
| 6 | VPN-Index of vpn1: 301 |

Table 2 may also be referred to as a VPN instance-GID mapping table of the PE 1. Table 3 may also be referred to as a VPN instance-GID mapping table of the PE 2. Table 4 may also be referred to as a VPN instance-GID mapping table of the PE 3. These VPN instance-GID mapping tables include a mapping relationship between attribute information of a related VPN instance and a GID allocated to the attribute information.

S190. The controller separately delivers, to the PE 1, the PE 2, and the PE 3, a VPN instance-GID mapping table corresponding to a corresponding PE. For example, the controller sends, to the PE 1 device, only a VPN instance-GID mapping table (shown in Table 2) corresponding to "PE 1: 1.1.1.1"; sends, to the PE 2 device, only a VPN instance-GID mapping table (shown in Table 3) corresponding to "PE 2: 2.2.2.2"; sends, to the PE 3 device, only a VPN instance-GID mapping table (shown in Table 4) corresponding to "PE 3: 3.3.3.3".

After receiving the VPN instance-GID mapping table, shown in Table 2, that is delivered by the controller, the PE 1 locally stores the VPN instance-GID mapping table. Therefore, it is well known to the PE 1 and the controller that the GID "1" is mapped to the attribute information "VPN-Instance Name: vpn1" of the VPN instance of the CE 1. It should be understood that, on the PE 1, the GID "1" (or any one of the GID "2" to the GID "6") can uniquely indicate the VPN instance of the CE 1, and the GID "7" (or any one of the GID "8" to the GID "12") can uniquely indicate the VPN instance of the CE 2.

Optionally, in this embodiment of the present invention, the GID used to indicate the second resource is a GID, such as the GID "1", that is corresponding to particular attribute information of the VPN instance of the CE 1. The characteristic information of the first resource may also be a GID, such as the GID "6", that is corresponding to particular attribute information of the VPN instance of the CE 1.

It should be understood that, in this embodiment of the present invention, a global identifier allocated by the controller to attribute information of a VPN instance on a PE device (such as the PE 1/2/3 shown in FIG. 1) may also be referred to as a mapping label. The GID carried in a GID field of the extended community attribute field in the BGP Flow Spec protocol packet is one or more identifiers of the mapping labels.

Therefore, in this embodiment of the present invention, the PE device can locate the VPN instance of the CE 1 by using the GID. Therefore, in this embodiment of the present invention, the VPN instance of the CE 1 can be indicated by adding the concise GID to the extended community attribute field in the BGP Flow Spec protocol packet. In this way, signaling overheads can be reduced.

Specifically, in this embodiment of the present invention, when the characteristic information of the first resource may be one or more of a VPN instance name, a VPN RD, a VPN RT, a VPN index, a VPN interface, an IP address prefix, and a MAC address that are of the CE 2 or a GID allocated by the controller to the attribute information of the VPN instance of the CE 2, the characteristic information of the first resource is encapsulated in Flow Spec NLRI in a TLV (Type/Length/Value, type/length/value) manner, as shown in Table 5:

TABLE 5

| Type value (Type) | Information corresponding to a value |
| --- | --- |
| TLV 1 | Generic ID |
| TLV 2 | VPN name |
| TLV 3 | VPN index |
| TLV 4 | VPN RT |

TABLE 5-continued

| Type value (Type) | Information corresponding to a value |
| --- | --- |
| TLV 5 | VPN RD |
| TLV 6 | Interface |
| TLV 7 | Source IP address prefix |
| TLV 8 | Destination IP address prefix |
| TLV 9 | Source MAC address |
| TLV 10 | Destination MAC address |

Optionally, in this embodiment of the present invention, the extended community attribute field in the BGP Flow Spec protocol packet includes a flag field and the GID field. The flag filed includes a forwarding plane bit and a control plane bit. When 0 is assigned to the forwarding plane bit and 1 is assigned to the control plane bit, it indicates that the first resource is to be associated with the second resource on the control plane, and when 1 is assigned to the forwarding plane bit and 0 is assigned to the control plane bit, it indicates that the first resource is to be associated with the second resource on a forwarding plane. The GID field carries the second identifier.

In the conventional technology, an extended application usually guides, only on the forwarding plane, a data flow to enter a corresponding forwarding channel. However, in this embodiment of the present invention, a data flow not only can be guided on the forwarding plane to enter a corresponding forwarding channel, but also can be guided on the control plane to enter a corresponding forwarding channel. Therefore, flexible service orchestration can be implemented in this application.

It should be understood that, in this embodiment of the present invention, the forwarding plane bit and the control plane bit in the flag filed may be replaced with a first bit. When 1 is assigned to the first bit, it indicates that the first resource is to be associated with the second resource on the control plane, and when 0 is assigned to the first bit, it indicates that the first resource is to be associated with the second resource on the forwarding plane.

Optionally, in this embodiment of the present invention, the flag filed of the extended community attribute field further includes an additive bit. When 1 is assigned to the additive bit, it indicates that a resource association relationship is to be added on the forwarding device, and when 0 is assigned to the additive bit, it indicates that an association relationship between the first resource and the second resource is used to replace an original association relationship between the first resource and another resource.

Figure 3:
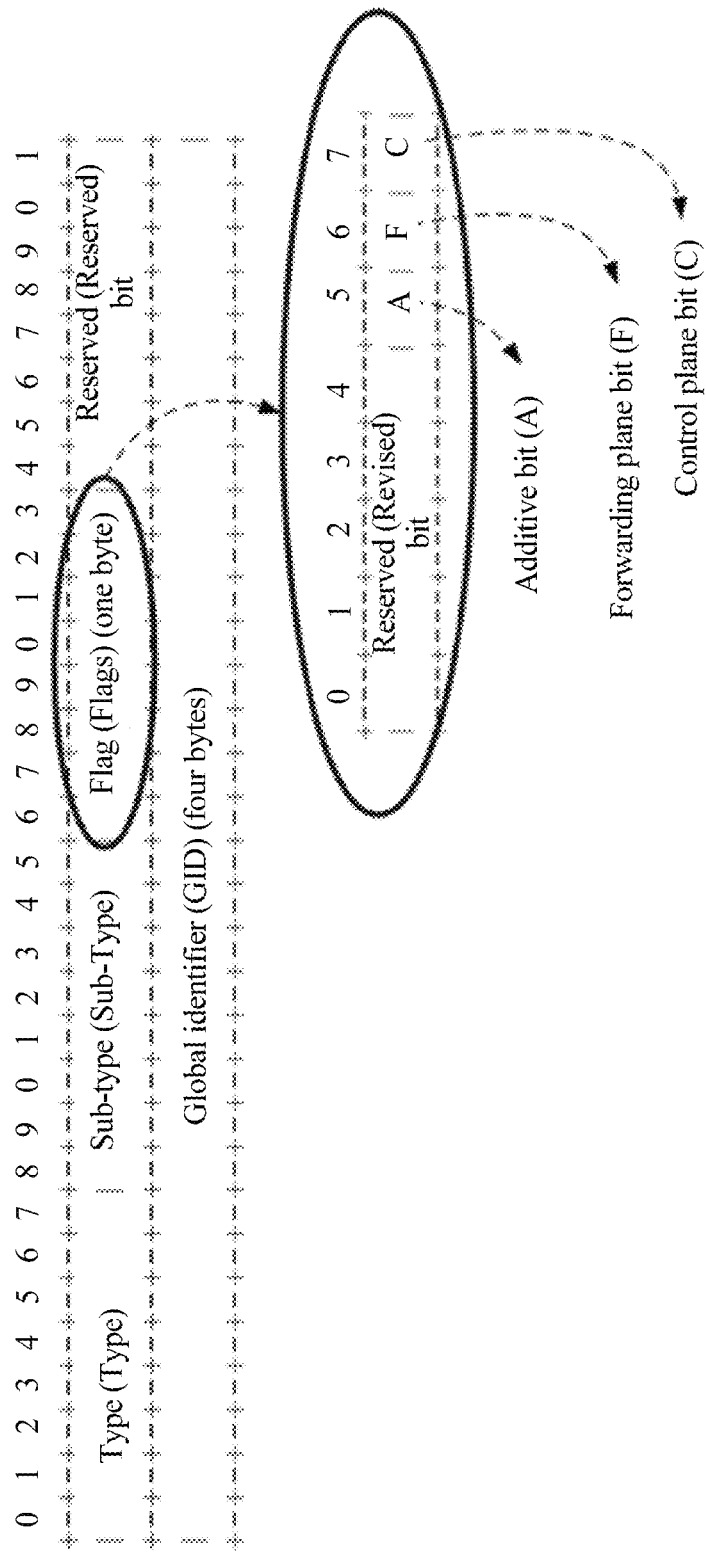
FIG. 3 is a schematic diagram of a format of an extended community attribute field according to an embodiment of the present invention.

Specifically, as shown in FIG. 3, a format of the extended community attribute field includes a type field, a sub-type field, a flag field, a reserved field, and the GID field. The type field and the sub-type field are to be formally allocated by an IETF standards organization. "Reserved" is a reserved field, and "0" is assigned to the reserved field. The flag filed occupies one byte. A bit 7 is the control plane bit (Control-Plane Bit, control plane bit). When the bit 7 is set to 1, it indicates that the first resource is to be associated with the second resource on the control plane; otherwise, the bit 7 is set to 0. A bit 6 is the forwarding plane bit (Forwarding-Plane Bit, F bit). When the bit 6 is set to 1, it indicates that the first resource is to be associated with the second resource on the forwarding plane; otherwise, the bit 6 is set to 0. A bit 5 is the additive bit (Additive Bit, A bit). When the bit 5 is set to 1, it indicates that an association relationship is to be added on the basis of an original association relationship; otherwise, a new association relationship is to be used to replace an original association relationship. The GID field carries the second identifier. The second identifier is a GID corresponding to particular attribute information of the VPN instance of the CE 2.

It should be understood that, in this embodiment of the present invention, the BGP Flow Spec protocol packet delivered by the controller to the PE 1 is used to instruct to add the routing information of the CE 2 to VRF of the VPN instance of the CE 1. The action is on the control plane. Therefore, as shown in FIG. 3, "1" is assigned to the C bit in the flag filed in the extended community attribute field, "0" is assigned to the F bit, and a value of the A bit may be determined according to a specific service requirement.

In this embodiment of the present invention, the format of the extended community attribute field is simple and clear. An action to be performed is indicated to the PE device by using the C bit, the F bit, and the GID field. In addition, different combinations of the bits A, C, and F enable the extended community attribute to indicate different actions, so as to avoid unlimited extension of the BGP Flow Spec protocol in the prior art.

In this embodiment of the present invention, an extended community attribute including the second identifier may be referred to as an extended community attribute named "Redirect to GID Action".

In this embodiment of the present invention, the controller delivers the BGP Flow Spec protocol packet to the PE device (that is, the forwarding device), to instruct the PE device to add, to the routing table of the first CE device, the routing information of the second CE device whose VPN RT attribute does not match that of the first CE device, so that a data packet from the first CE device can be guided to enter a forwarding channel of the second CE device, that is, the first CE device accesses the second CE device, where VPN RT attributes of the first CE device and the second CE device do not match. Therefore, compared with the manual configuration manner in the prior art, in this application, VPN communication between two CE devices whose VPN RT attributes do not match can be flexibly and efficiently implemented. In addition, compared with the conventional technology in which a data flow is guided only on the forwarding plane to enter a corresponding forwarding channel, in this application, a data flow can be guided on the control plane to enter a corresponding forwarding channel, so that flexible service orchestration can be implemented.

Figure 4:
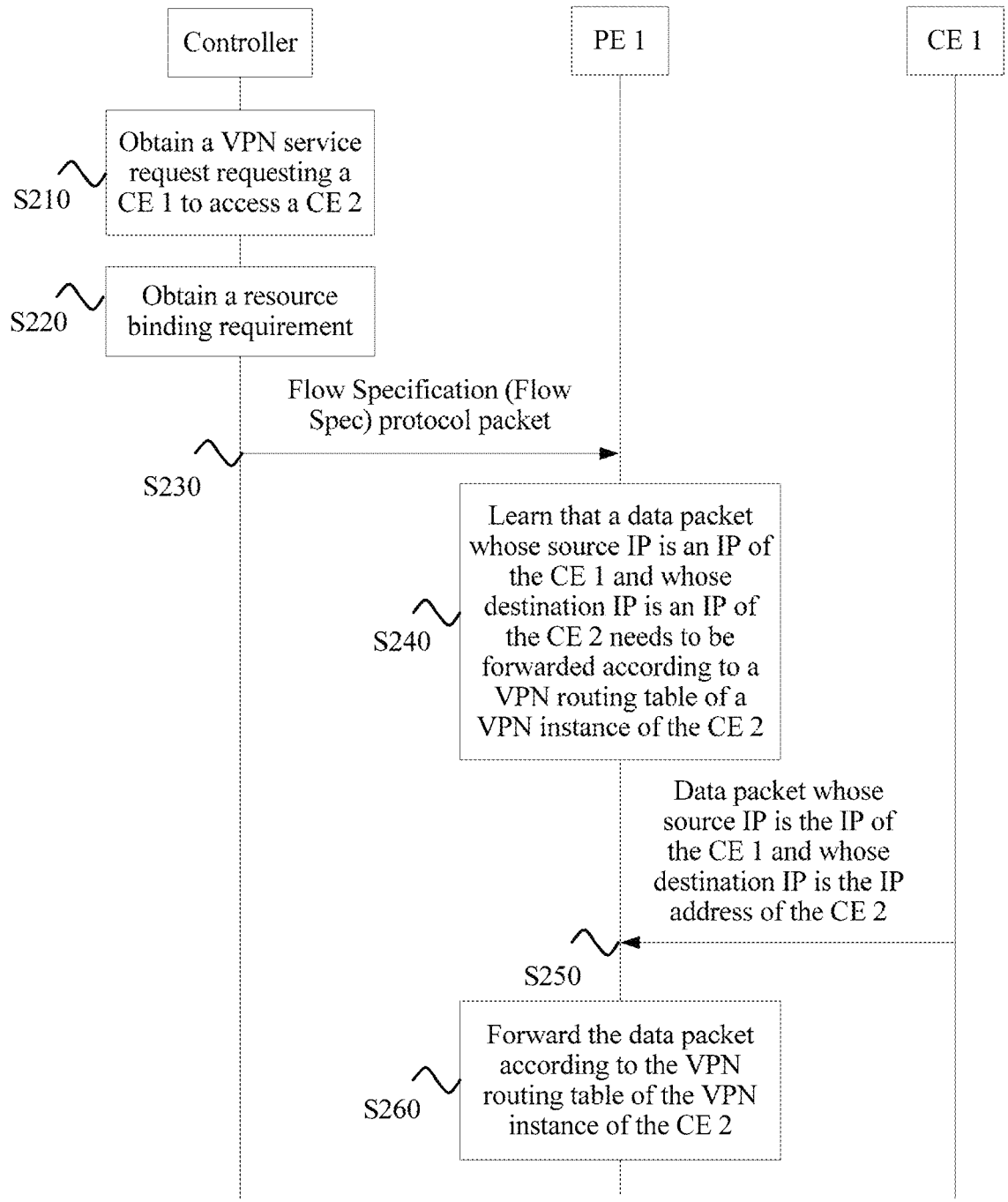
FIG. 4 is another schematic flowchart of a Flow Specification Flow Spec-based communication method according to an embodiment of the present invention.

As shown in FIG. 4, an embodiment of the present invention further provides a method 200 for associating a first resource with a second resource on a forwarding plane. The scenario shown in FIG. 1 is still used as an example. The method 200 includes the following steps.

S210. A controller (such as an SDN controller shown in FIG. 1) receives a VPN service request of a user side (such as an orchestrator/a network manager/a user APP shown in FIG. 1), where the VPN service request is used to request a CE 1 to access a CE 2, that is, to guide a data packet from the CE 1 to enter a forwarding channel of the CE 2.

S220. The controller obtains, according to the VPN service request, a requirement indicating that a first resource needs to be associated with a second resource, where a source IP address of the first resource is an IP address of the CE 1, a destination IP address of the first resource is an IP address of the CE 2, and the second resource is a VPN instance of the CE 2.

S230. The controller sends a BGP Flow Spec protocol packet to a PE 1 according to the requirement, where the BGP Flow Spec protocol packet includes a network layer reachability information field and an extended community attribute field, the network layer reachability information field carries characteristic information of the first resource, the extended community attribute field carries a global identifier GID used to indicate the second resource, the characteristic information of the first resource indicates that the source IP address is the IP address of the CE 1, and the destination IP address is the IP address of the CE 2, and the BGP Flow Spec protocol packet is used to instruct to forward, according to a VPN routing and forwarding table of the VPN instance of the CE 2, a data packet whose source IP address and destination IP address are consistent with those indicated in the characteristic information of the first resource.

S240. After receiving the BGP Flow Spec protocol packet delivered by the controller, the PE 1 parses the BGP Flow Spec protocol packet, and learns that there is a need to bind the VPN instance of the CE 2 and the data packet whose source IP address is the IP address of the CE 1 and whose destination IP address is the IP address of the CE 2.

S250. The PE 1 receives the data packet from the CE 1, where the source IP address of the data packet is the IP address of the CE 1, and the destination IP address of the data packet is the IP address of the CE 2.

S260. The PE 1 searches VRF table of the VPN instance of the CE 2 according to the destination IP address of the data packet, determines a forwarding egress of the data packet, that is, an Interface 2 of the VPN instance of the CE 2, and forwards the data packet from the interface 2, so that the data packet is transferred to the CE 2, that is, the CE 1 accesses CE 2.

Specifically, a format of the extended community attribute field is shown in FIG. 3. In addition, "0" is assigned to a C bit in a flag field, "1" is assigned to an F bit, and a GID field carries a GID (such as a GID, shown in Table 2, that is allocated by the controller to attribute information of the VPN instance of the CE 2) corresponding to the attribute information of the VPN instance of the CE 2.

It should be understood that, if the VPN service request is that the CE 2 needs to access the CE 1, the CE 2 can access the CE 1 only by interchanging locations of the CE 1 and the CE 2 in step S210 to step S260.

In this embodiment of the present invention, the controller delivers the BGP Flow Spec protocol packet to the PE device, to instruct the PE device to forward, according to a forwarding table of the second CE device whose VPN RT attribute does not match that of the first CE device, the data packet whose source IP address is the IP address of the first CE device and whose destination IP address is the IP address of the second CE device, so that a data packet from the first CE device can be guided to enter a forwarding channel of the second CE device, that is, the first CE device accesses the second CE device, where VPN RT attributes of the first CE device and the second CE device do not match. Therefore, compared with a manual configuration manner in the prior art, in this application, VPN communication between two CE devices whose VPN RT attributes do not match can be flexibly and efficiently implemented.

The solution described in the foregoing steps S170 to S190 is also applicable to the method 200 for performing an action on the forwarding plane, as shown in FIG. 4. To avoid repetition, details are not described herein again.

It should be noted that, in both of the methods described with reference to FIG. 2 and FIG. 4, an example in which the VPN service request is that the CE 1 accesses the CE 2, or the CE 2 accesses the CE 1 is used for description, that is, an accessing end CE and an accessed end CE are directly connected to a same PE device. However, this embodiment of the present invention is not limited thereto. The method provided in this embodiment of the present invention may also be applied to an application scenario in which an accessing end CE and an accessed end CE are separately and directly connected to different PE devices.

In an application scenario in which an accessing end CE and an accessed end CE are separately and directly connected to different PE devices, steps for accessing the accessed end CE by the accessing end CE by using the method provided in this embodiment of the present invention and by performing an action on a control plane are as follows:

Network deployment shown in FIG. 1 is still used as an example for description. A controller (such as an SDN controller shown in FIG. 1) receives a VPN service request of a user side (such as an orchestrator/a network manager/a user APP shown in FIG. 1). The VPN service request is used to request a CE 1 to access a CE 3, that is, to guide a data packet from the CE 1 to enter a forwarding channel of the CE 3. The controller obtains, according to the VPN service request, a requirement indicating that a first resource needs to be associated with a second resource. The first resource is routing information of the CE 3, and the second resource is a VPN instance of the CE 1. The controller sends a BGP Flow Spec protocol packet to a PE 1 according to the requirement. The BGP Flow Spec protocol packet includes a network layer reachability information field and an extended community attribute field. The network layer reachability information field carries characteristic information of the first resource, and the extended community attribute field carries a global identifier GID used to indicate the second resource. The characteristic information of the first resource indicates information that can indicate the routing information of the CE 3. The BGP Flow Spec protocol packet is used to instruct to add the routing information of the CE 3 to VRF table of the VPN instance of the CE 1. After receiving the BGP Flow Spec protocol packet delivered by the controller, the PE 1 parses the BGP Flow Spec protocol packet, to obtain the routing information of the CE 3 according to the characteristic information of the first resource and obtain the VPN instance of the CE 1 according to the GID, and then adds the routing information of the CE 3 to VRF table of the VPN instance of the CE 1. The PE 1 receives, from an Interface 1, a data packet from the CE 1 that is to access the CE 3, that is, a source IP address of the data packet is an IP address of the CE 1, and a destination IP address of the data packet is an IP address of the CE 3. The PE 1 searches VRF table of the VPN instance of the CE 1 according to the destination IP address of the data packet, to obtain the routing information of the CE 3, and guides the data packet to the forwarding channel of the CE 3 according to a forwarding entry of routing information of the CE 3.

It should be understood that, although the PE 1 is not directly connected to the CE 3, the PE 1 may obtain the routing information of the CE 3 by communicating with a PE 2. With reference to the foregoing description about a concept of VPN-IPv4, a person skilled in the art can understand that, after obtaining an IPv4 (which may be alternatively IPv6) address of the CE 2, the PE 2 adds, to the IPv4 address, RD and ERT attributes of a VPN instance of the CE 3 (it should be understood that the VPN instance of the CE 3 is established on the PE 2, as shown in FIG. 1), to obtain a VPN-IPv4 route of the CE 3, and then publishes the VPN-IPv4 route to the PE 1 by using a communication link between the PE 2 and the PE 1. Therefore, the PE 1 obtains the routing information of the CE 3.

It should be understood that, a method for accessing the CE 1 by the CE 3 is similar to the foregoing description. The method can be implemented by interchanging locations of the CE 1 and the CE 3, and interchanging locations of the PE 1 and the PE 2.

In an application scenario in which an accessing end CE and an accessed end CE are separately and directly connected to different PE devices, steps for accessing the accessed end CE by the accessing end CE by using the method provided in this embodiment of the present invention and by performing an action on a forwarding plane are as follows:

Network deployment shown in FIG. 1 is still used as an example for description. In addition, it is assumed that attribute information of a VPN instance, on a PE 1, of a CE 2 is as follows:

VPN-Instance Name: vpn2
RD: 100:2
IRT: 100:2
ERT: 100:1
Interface: interface 2 (such as an interface 2 on the PE 1 shown in FIG. 1)
VPN-Index: 102 (not shown in FIG. 1)

That is, RT attributes of a VPN instance of a CE 3 and the VPN instance of the CE 2 match each other, and VRF table of the VPN instance that is of the CE 2 and that is maintained on the PE 1 includes routing information of the CE 3. That is, the VPN forwarding table of the VPN instance of the CE 2 includes a forwarding entry of the routing information of the CE 3.

A controller (such as an SDN controller shown in FIG. 1) receives a VPN service request of a user side (such as an orchestrator/a network manager/a user APP shown in FIG. 1). The VPN service request is used to request a CE 1 to access the CE 3, that is, to guide a data packet from the CE 1 to enter a forwarding channel of the CE 3. The controller obtains, according to the VPN service request, a requirement indicating that a first resource needs to be associated with a second resource. A source IP address of the first resource is an IP address of the CE 1, a destination IP address of the first resource is an IP address of the CE 3, and the second resource is a VPN instance of the CE 3. The controller sends a BGP Flow Spec protocol packet to the PE 1 according to the requirement. The BGP Flow Spec protocol packet includes a network layer reachability information field and an extended community attribute field. The network layer reachability information field carries characteristic information of the first resource, and the extended community attribute field carries a global identifier GID used to indicate the second resource. The characteristic information of the first resource indicates that the source IP address is the IP address of the CE 1, and the destination IP address is the IP address of the CE 2. The BGP Flow Spec protocol packet is used to instruct to forward, according to a VPN routing and forwarding table of the VPN instance of the CE 3, a data packet whose source IP address and destination IP address are consistent with those indicated in the characteristic information of the first resource. The PE 1 parses the BGP Flow Spec protocol packet after receiving the BGP Flow Spec protocol packet delivered by the controller. The PE 1 receives the data packet from the CE 1. The source IP address of the data packet is the IP address of the CE 1, and the destination IP address of the data packet is the IP address of the CE 2. The PE 1 searches a VPN forwarding table of the VPN instance of the CE 2 according to the destination IP address of the data packet, to locate the forwarding entry of the routing information of the CE 3, and then forwards the data packet according to the forwarding entry. In this way, the data packet can reach the CE 3, so that the CE 1 accesses the CE 3.

It should be understood that, an application scenario in which an accessing end CE and an accessed end CE are separately and directly connected to different PE devices, a precondition for accessing the accessed end CE by the accessing end CE by using the method provided in this embodiment of the present invention and by performing an action on the forwarding plane is that a VPN instance is on a PE device that is directly connected to the accessing end CE, and VRF of the VPN instance includes routing information of the accessed end CE.

According to the Flow Specification Flow Spec-based communication method provided in this embodiment of the present invention, a VPN routing table is modified on the control plane, so that VPN communication between CE devices whose RT attributes do not match can be flexibly and efficiently implemented.

Therefore, in this embodiment of the present invention, the network layer reachability information field in the BGP Flow Spec protocol packet carries the characteristic information of the first resource, and the extended community attribute field carries the global identifier GID used to indicate the second resource, so as to instruct a forwarding device to associate the first resource with the second resource, to guide a data flow to enter a corresponding forwarding channel. Compared with a conventional technology, the BGP Flow Spec protocol in this application may meet a plurality of service requirements by using a unified packet format, so as to effectively avoid unlimited extension of an extended community attribute in the BGP Flow Spec protocol. In addition, the second resource can be indicated by adding the concise GID to the extended community attribute field in the BGP Flow Spec protocol packet. In this way, signaling overheads can be reduced.

Optionally, in this embodiment of the present invention, the method further includes the following steps.

The controller obtains a second VPN service request. The second VPN service request is used to request to configure attribute information for a VPN instance that is of a CE 5 (shown in FIG. 5) and that is newly added on the PE 2 device, and configure attribute information for a VPN instance that is of a CE 6 (shown in FIG. 5) and that is newly added on the PE 3 device.

According to the second VPN service request, the controller configures the following attribute information for the VPN instance of the CE 5: a VPN instance name, a VPN instance RD, a VPN instance RT, a VPN instance index value, and VPN instance interface information, and configures the following attribute information for the VPN instance of the CE 6: a VPN instance name, a VPN instance RD, a VPN instance RT, a VPN instance index value, and VPN instance interface information. The following attribute information of the VPN instance of the CE 5 device and the VPN instance of the CE 3 do not conflict: the VPN instance name, the VPN instance RD, and the VPN instance interface information. The following attribute information of the VPN instance of the CE 6 device and a VPN instance of a CE 4 do not conflict: the VPN instance name, the VPN instance RD, and the VPN instance index information.

Figure 5:
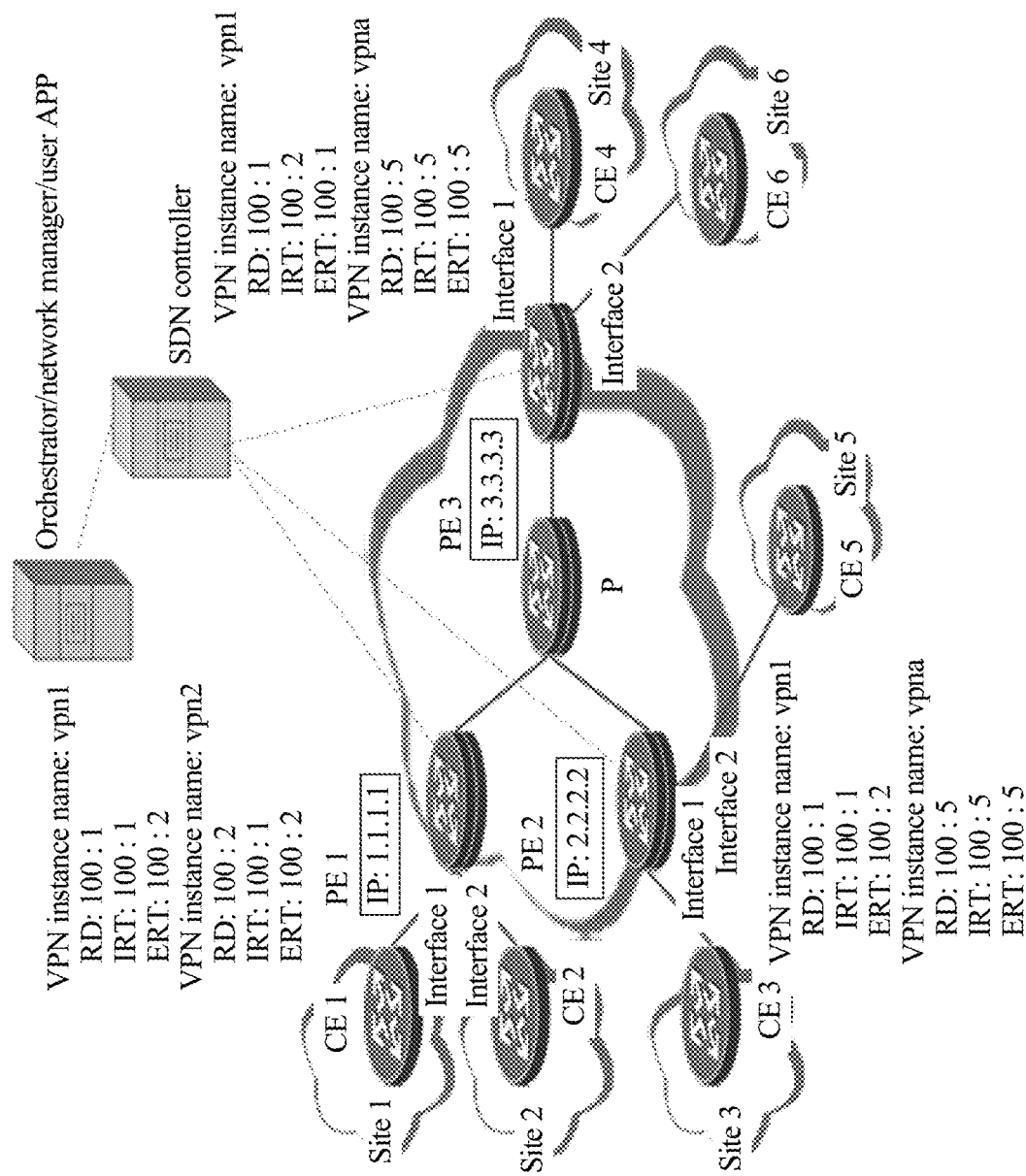
FIG. 5 is a schematic diagram of a Flow Specification Flow Spec-based communication method according to an embodiment of the present invention.

Specifically, as shown in FIG. 5, a user has two devices CE 5 and CE 6. Currently, the two devices CE 5 and CE 6 need to be connected in a VPN manner by using a network of an operator.

Step 1: The user sends a VPN service request to the controller, where the VPN service request is used to request to connect the CE 5 and the CE 6 in a VPN manner.

Specifically, the VPN service request includes CE device information of the CE 5 and the CE 6, such as an IP address and a MAC address.

Step 2: The controller learns, according to CE device information carried in the VPN service request, that the CE 5 is connected to the PE 2 and the CE 6 is connected to the PE 3, and therefore determines to deploy a VPN instance on the PE 2 and the PE 3, to connect the CE 5 and the CE 6.

Step 3: The controller configures, on the PE 2, a VPN instance corresponding to the CE 5, and allocates a GID to attribute information of the VPN instance of the CE 5, as shown in Table 6. It can be learned from Table 6 that, the controller allocates, to the VPN instance that is of the CE 5 and that is on the PE 2, attribute information, such as a VPN-instance name, an RD, an IRT, an ERT, and a VPN-index, that does not conflict with existing attribute information of the VPN instance of the CE 3, and also allocates a GID value to each piece of attribute information of the VPN instance of the CE 5.

Step 4: The controller delivers, to the PE 2, the attribute information that is of the VPN instance of the CE 5 and that is newly allocated to the PE 2.

Step 5: The controller delivers, to the PE 2, a GID resource table (shown in Table 6) obtained after the attribute information of the VPN instance of the CE 5 is newly added, to synchronize GID resource table information on the controller with that on a controlled device.

TABLE 6

| PE 2: 2.2.2.2 | |
|---|---|
| GID | Resource description |
| 1 | VPN-Instance Name: vpn1 |
| 2 | RD of vpn1: 100:1 |
| 3 | IRT of vpn1: 100:1 |
| 4 | ERT of vpn1: 100:2 |
| 5 | Interface of vpn1: interface 1 |
| 6 | VPN-Index of vpn1: 201 |
| 7 | VPN-Instance Name: vpna |
| 8 | RD of vpna: 100:5 |
| 9 | IRT of vpna: 100:5 |
| 10 | ERT of vpna: 100:5 |
| 11 | Interface of vpna: interface 2 |
| 12 | VPN-Index of vpna: 202 |

Only a processing process related to the PE 2 is described in steps 3, 4, and 5. In an actual implementation process, a processing process of the PE 3 is the same as that of the PE 2.

Therefore, in this embodiment of the present invention, the controller obtains attribute information of an existing VPN instance on the PE device, so that a conflict between attribute information of different VPN instances can be avoided when the controller configures attribute information for a VPN instance added on the PE device. Compared with the prior art in which a conflict is avoided by means of planning, in this application, a conflict can be effectively avoided, and operation efficiency is relatively high.

Figure 6:
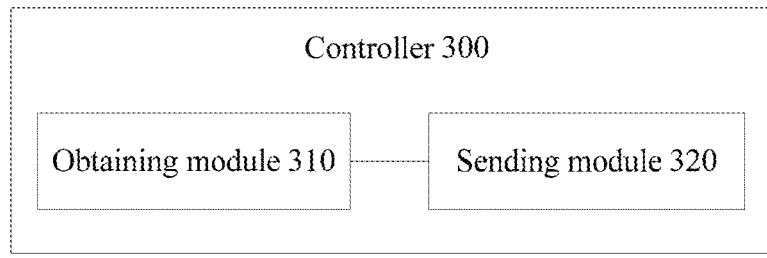
FIG. 6 is a schematic block diagram of a controller according to an embodiment of the present invention.

FIG. 6 is a schematic block diagram of a controller 300 according to an embodiment of the present invention. As shown in FIG. 6, the controller 300 includes:

an obtaining module 310, configured to obtain a requirement indicating that a first resource on a forwarding device needs to be associated with a second resource on the forwarding device; and a sending module 320, configured to send a Border Gateway Protocol Flow Specification BGP Flow Spec protocol packet to the forwarding device according to the requirement obtained by the obtaining module, where the BGP Flow Spec protocol packet includes a network layer reachability information field and an extended community attribute field, the network layer reachability information field carries characteristic information of the first resource, the extended community attribute field carries a global identifier GID used to indicate the second resource, and the BGP Flow Spec protocol packet is used to instruct to associate the first resource with the second resource.

Therefore, in this embodiment of the present invention, the network layer reachability information field in the BGP Flow Spec protocol packet carries the characteristic information of the first resource, and the extended community attribute field carries the global identifier GID used to indicate the second resource, so as to instruct the forwarding device to associate the first resource with the second resource, to guide a data flow to enter a corresponding forwarding channel. Compared with a conventional technology, the BGP Flow Spec protocol in this application may meet a plurality of service requirements by using a unified packet format, so as to effectively avoid unlimited extension of an extended community attribute in the BGP Flow Spec protocol. In addition, the second resource can be indicated by adding the concise GID to the extended community attribute field in the BGP Flow Spec protocol packet. In this way, signaling overheads can be reduced.

Optionally, in this embodiment of the present invention, the extended community attribute field includes a GID field and a flag field, the GID field carries the GID, and the flag filed carries information used to instruct to associate the first resource with the second resource on a control plane of the forwarding device or on a forwarding plane of the forwarding device.

Optionally, in this embodiment of the present invention, the flag filed includes a forwarding plane bit and a control plane bit. When 0 is assigned to the forwarding plane bit and 1 is assigned to the control plane bit, it indicates that the first resource is to be associated with the second resource on the control plane, and when 1 is assigned to the forwarding plane bit and 0 is assigned to the control plane bit, it indicates that the first resource is to be associated with the second resource on the forwarding plane.

Optionally, in this embodiment of the present invention, the forwarding device is a provider edge PE device. A virtual private network VPN instance of a first customer edge CE device is established on the forwarding device. The forwarding device includes routing information of a second CE device, and the routing information of the second CE device is not in a VPN routing table of the VPN instance of the first CE device. The obtaining module 310 is configured to: obtain a VPN service request, where the VPN service request is used to request the first CE device to access the second CE device; and obtain, according to the VPN service request, the requirement indicating that the first resource needs to be associated with the second resource, where the first resource is the routing information of the second CE device, and the second resource is the VPN instance of the first CE device.

The sending module 320 is configured to send the BGP Flow Spec protocol packet to the forwarding device according to the requirement, where the flag filed in the BGP Flow Spec protocol packet is used to instruct to associate the first resource with the second resource on the control plane, and the BGP Flow Spec protocol packet is used to instruct to add the routing information of the second CE device to the VPN routing table of the VPN instance of the first CE device.

Optionally, in this embodiment of the present invention, the obtaining module 310 is further configured to obtain, from the forwarding device, attribute information of the VPN instance of the first CE device, where the attribute information includes a VPN instance name, a VPN instance route distinguisher RD, a VPN instance route target RT, a VPN instance index value, and VPN instance interface information.

The controller 300 further includes:
an identifier allocation module 330, configured to allocate a mapping identifier to the attribute information of the VPN instance of the first CE device, where the mapping identifier uniquely indicates, in the forwarding device, the attribute information of the VPN instance of the first CE device.

The sending module 320 is further configured to send a mapping table to the forwarding device, where the mapping table includes a mapping relationship between the attribute information of the VPN instance of the first CE device and the mapping identifier.

The GID carried in the GID field is one or more mapping identifiers.

Optionally, in this embodiment of the present invention, the obtaining module 310 is further configured to obtain a VPN service request used to request to configure attribute information for a VPN instance that is of a third CE device and that is newly established on the forwarding device.

The controller 300 further includes:
a VPN instance configuration module 340, configured to configure the following attribute information for the VPN instance of the third CE device: a VPN instance name, a VPN instance RD, a VPN instance RT, and VPN instance interface information, where the following attribute information of the VPN instance of the third CE device does not conflict with the attribute information corresponding to the VPN instance of the first CE device: the VPN instance name, the VPN instance RD, and the VPN instance interface information.

Optionally, in this embodiment of the present invention, a VPN instance of the second CE device is established on the forwarding device, and a VPN routing table of the VPN instance of the second CE device includes the routing information of the second CE device.

The characteristic information of the first resource is at least one piece of the following attribute information of the VPN instance of the second CE device: a VPN instance name, a VPN instance RD, a VPN instance index value, VPN instance interface information, or a VPN instance GID.

Optionally, in this embodiment of the present invention, a VPN instance of the second CE device is not established on the forwarding device, and a VPN public-network routing table of the forwarding device includes the routing information of the second CE device.

The characteristic information of the first resource is at least one piece of the following information: RD information, export target Export Target information, or route prefix information that is corresponding to the routing information of the second CE device.

Optionally, in this embodiment of the present invention, the forwarding device is a provider edge PE device. A virtual private network VPN instance of a first customer edge CE device and a VPN instance of a third CE device are established on the forwarding device. The forwarding device further includes routing information of a second CE device, a VPN routing table of the VPN instance of the first CE device does not include the routing information of the second CE device, and a VPN routing table of the VPN instance of the third CE device includes the routing information of the second CE device. The obtaining module 310 is configured to: obtain a VPN service request, where the VPN service request is used to request the first CE device to access the second CE device; and obtain, according to the VPN service request, the requirement indicating that the first resource needs to be associated with the second resource, where a source IP address of the first resource is an IP address of the first CE device, a destination IP address of the first resource is an IP address of the second CE device, and the second resource is the VPN instance of the third CE device.

The sending module 320 is further configured to send the BGP Flow Spec protocol packet to the forwarding device according to the requirement, where the flag filed in the BGP Flow Spec protocol packet is used to instruct to associate the first resource with the second resource on the forwarding plane, and the BGP Flow Spec protocol packet is used to instruct to forward, according to the routing information that is of the second CE device and that is included in the VPN routing table of the VPN instance of the third CE device, a data packet whose source IP address and destination IP address are consistent with those of the first resource.

Optionally, in this embodiment of the present invention, the second CE device is the third CE device.

It should be understood that the controller 300 in this embodiment of the present invention may be corresponding to a controller in a Flow Spec-based communication method in an embodiment of the present invention. In addition, the foregoing and other operations and/or functions of the modules of the controller 300 are separately used to implement corresponding procedures of methods in FIG. 1 to FIG. 5. For brevity, details are not described herein again.

Figure 7:
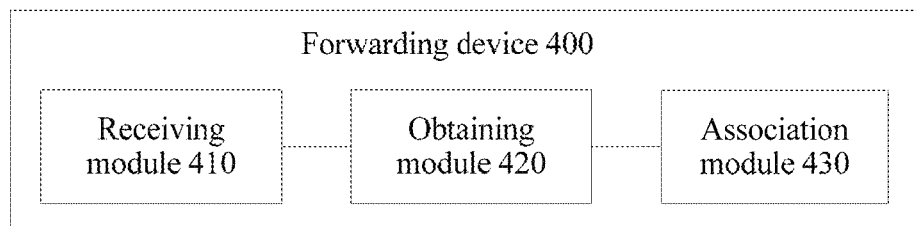
FIG. 7 is a schematic block diagram of a forwarding device according to an embodiment of the present invention.

FIG. 7 is a schematic block diagram of a forwarding device 400 according to an embodiment of the present invention. As shown in FIG. 7, the forwarding device 400 includes:

a receiving module 410, configured to receive a Border Gateway Protocol Flow Specification BGP Flow Spec protocol packet sent by a controller, where the BGP Flow Spec protocol packet includes a network layer reachability information field and an extended community attribute field, the network layer reachability information field carries characteristic information, of a first resource, that is used to indicate the first resource on the forwarding device, the extended community attribute field carries a global identifier GID used to indicate a second resource on the forwarding device, and the BGP Flow Spec protocol packet is used to instruct to associate the first resource with the second resource;

an obtaining module 420, configured to: obtain the first resource according to the characteristic information that is of the first resource and that is received by the receiving module, and obtain the second resource according to the GID; and an association module 430, configured to associate the first resource with the second resource according to the BGP Flow Spec protocol packet received by the receiving module.

Therefore, in this embodiment of the present invention, the network layer reachability information field in the BGP Flow Spec protocol packet carries the characteristic information of the first resource, and the extended community attribute field carries the global identifier GID used to indicate the second resource, so as to instruct the forwarding device to associate the first resource with the second resource, to guide a data flow to enter a corresponding forwarding channel. Compared with a conventional technology, the BGP Flow Spec protocol in this application may meet a plurality of service requirements by using a unified packet format, so as to effectively avoid unlimited extension of an extended community attribute in the BGP Flow Spec protocol. In addition, the second resource can be indicated by adding the concise GID to the extended community attribute field in the BGP Flow Spec protocol packet. In this way, signaling overheads can be reduced.

Optionally, in this embodiment of the present invention, the extended community attribute field includes a GID field and a flag field, the GID field carries the GID, and the flag filed carries information used to instruct to associate the first resource with the second resource on a control plane of the forwarding device or on a forwarding plane of the forwarding device.

Optionally, in this embodiment of the present invention, the flag filed includes a forwarding plane bit and a control plane bit. When 0 is assigned to the forwarding plane bit and 1 is assigned to the control plane bit, it indicates that the first resource is to be associated with the second resource on the control plane, and when 1 is assigned to the forwarding plane bit and 0 is assigned to the control plane bit, it indicates that the first resource is to be associated with the second resource on the forwarding plane.

Optionally, in this embodiment of the present invention, the forwarding device 400 is a provider edge PE device. A virtual private network VPN instance of a first customer edge CE device is established on the forwarding device. The forwarding device includes routing information of a second CE device, and the routing information of the second CE device is not in a VPN routing table of the VPN instance of the first CE device. The receiving module 410 is configured to receive the BGP Flow Spec protocol packet sent by the controller according to a VPN service request, where the VPN service request is used to request the first CE device to access the second CE device, the first resource is the routing information of the second CE device, the second resource is the VPN instance of the first CE device, the flag filed in the BGP Flow Spec protocol packet is used to instruct to associate the first resource with the second resource on the control plane, and the BGP Flow Spec protocol packet is used to instruct to add the routing information of the second CE device to the VPN routing table of the VPN instance of the first CE device.

The association module 430 is configured to add the routing information of the second CE device to the VPN routing table of the VPN instance of the first CE device.

Optionally, in this embodiment of the present invention, the forwarding device 400 further includes:

a sending module 440, configured to send attribute information of the VPN instance of the first CE device to the controller, where the attribute information includes a VPN instance name, a VPN instance route distinguisher RD, a VPN instance route target RT, a VPN instance index value, and VPN instance interface information.

The receiving module 410 is configured to receive a mapping table sent by the controller, where the mapping table includes a mapping relationship between the attribute information of the VPN instance of the first CE device and a mapping identifier that is allocated by the controller to the attribute information of the VPN instance of the first CE device, and the mapping identifier uniquely indicates, in the forwarding device, the attribute information of the VPN instance of the first CE device.

The GID carried in the GID field is one or more mapping identifiers.

Optionally, in this embodiment of the present invention, a VPN instance of the second CE device is established on the forwarding device 400, and a VPN routing table of the VPN instance of the second CE device includes the routing information of the second CE device.

The characteristic information of the first resource is at least one piece of the following attribute information of the VPN instance of the second CE device: a VPN instance name, a VPN instance RD, a VPN instance index value, VPN instance interface information, or a VPN instance GID.

The obtaining module 420 is configured to obtain, from the VPN routing table of the VPN instance of the second CE device, the routing information of the second CE device according to the characteristic information of the first resource.

Optionally, in this embodiment of the present invention, a VPN instance of the second CE device is not established on the forwarding device 400, and a VPN public-network routing table of the forwarding device 400 includes the routing information of the second CE device.

The characteristic information of the first resource is at least one piece of the following information: RD information, export target Export Target information, or route prefix information that is corresponding to the routing information of the second CE device.

The obtaining module 420 is configured to obtain, from the VPN public-network routing table, the routing information of the second CE device according to the characteristic information of the first resource.

Optionally, in this embodiment of the present invention, the forwarding device 400 is a provider edge PE device. A virtual private network VPN instance of a first customer edge CE device and a VPN instance of a third CE device are established on the forwarding device 400. The forwarding device further includes routing information of a second CE device, a VPN routing table of the VPN instance of the first CE device does not include the routing information of the second CE device, and a VPN routing table of the VPN instance of the third CE device includes the routing information of the second CE device. The receiving module 410 is configured to receive the BGP Flow Spec protocol packet sent by the controller according to a VPN service request, where the VPN service request is used to request the first CE device to access the second CE device, a source IP address of the first resource is an IP address of the first CE device, a destination IP address of the first resource is an IP address of the second CE device, the second resource is the VPN instance of the third CE device, the flag filed in the BGP Flow Spec protocol packet is used to instruct to associate the first resource with the second resource on the forwarding plane, and the BGP Flow Spec protocol packet is used to instruct to forward, according to the routing information that is of the second CE device and that is included in the VPN routing table of the VPN instance of the third CE device, a data packet whose source IP address and destination IP address are consistent with those of the first resource.

The association module 430 includes:

a receiving unit, configured to receive the data packet, where the source IP address of the data packet is the IP address of the first CE device, and the destination IP address of the data packet is the IP address of the second CE device; and a forwarding unit, configured to forward the data packet according to the routing information that is of the second CE device and that is included in the VPN routing table of the VPN instance of the third CE device.

Optionally, in this embodiment of the present invention, the second CE device is the third CE device.

It should be understood that the forwarding device 400 in this embodiment of the present invention may be corresponding to a forwarding device in a Flow Spec-based communication method in an embodiment of the present invention. In addition, the foregoing and other operations and/or functions of the modules of the forwarding device 400 are separately used to implement corresponding procedures of methods in FIG. 1 to FIG. 5. For brevity, details are not described herein again.

Figure 8:
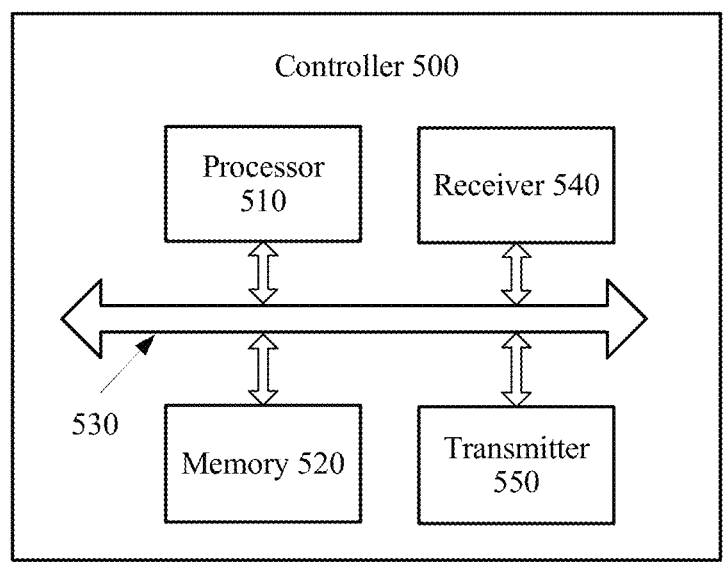
FIG. 8 is another schematic block diagram of a controller according to an embodiment of the present invention.

As shown in FIG. 8, an embodiment of the present invention further provides a controller 500. The controller 500 includes a processor 510, a memory 520, a bus system 530, a receiver 540, and a transmitter 550. The processor 510, the memory 520, the receiver 540, and the transmitter 550 are connected to each other by using the bus system 530. The memory 520 is configured to store an instruction. The processor 510 is configured to execute the instruction stored in the memory 520, to control the receiver 540 to receive a signal and control the transmitter 550 to send a signal. The processor 510 is configured to obtain a requirement indicating that a first resource on a forwarding device needs to be associated with a second resource on the forwarding device. The transmitter 550 is configured to send a Border Gateway Protocol Flow Specification BGP Flow Spec protocol packet to the forwarding device according to the requirement, where the BGP Flow Spec protocol packet includes a network layer reachability information field and an extended community attribute field, the network layer reachability information field carries characteristic information of the first resource, the extended community attribute field carries a global identifier GID used to indicate the second resource, and the BGP Flow Spec protocol packet is used to instruct to associate the first resource with the second resource.

Therefore, in this embodiment of the present invention, the network layer reachability information field in the BGP Flow Spec protocol packet carries the characteristic information of the first resource, and the extended community attribute field carries the global identifier GID used to indicate the second resource, so as to instruct the forwarding device to associate the first resource with the second resource, to guide a data flow to enter a corresponding forwarding channel. Compared with a conventional technology, the BGP Flow Spec protocol in this application may meet a plurality of service requirements by using a unified packet format, so as to effectively avoid unlimited extension of an extended community attribute in the BGP Flow Spec protocol. In addition, the second resource can be indicated by adding the concise GID to the extended community attribute field in the BGP Flow Spec protocol packet. In this way, signaling overheads can be reduced.

Optionally, in this embodiment of the present invention, the extended community attribute field includes a GID field and a flag field, the GID field carries the GID, and the flag filed carries information used to instruct to associate the first resource with the second resource on a control plane of the forwarding device or on a forwarding plane of the forwarding device.

Optionally, in this embodiment of the present invention, the flag filed includes a forwarding plane bit and a control plane bit. When 0 is assigned to the forwarding plane bit and 1 is assigned to the control plane bit, it indicates that the first resource is to be associated with the second resource on the control plane, and when 1 is assigned to the forwarding plane bit and 0 is assigned to the control plane bit, it indicates that the first resource is to be associated with the second resource on the forwarding plane.

Optionally, in this embodiment of the present invention, the forwarding device is a provider edge PE device. A virtual private network VPN instance of a first customer edge CE device is established on the forwarding device. The forwarding device includes routing information of a second CE device, and the routing information of the second CE device is not in a VPN routing table of the VPN instance of the first CE device. The processor 510 is configured to: obtain a VPN service request, where the VPN service request is used to request the first CE device to access the second CE device; and obtain, according to the VPN service request, the requirement indicating that the first resource needs to be associated with the second resource, where the first resource is the routing information of the second CE device, and the second resource is the VPN instance of the first CE device. The transmitter 550 is configured to send the BGP Flow Spec protocol packet to the forwarding device according to the requirement, where the flag filed in the BGP Flow Spec protocol packet is used to instruct to associate the first resource with the second resource on the control plane, and the BGP Flow Spec protocol packet is used to instruct to add the routing information of the second CE device to the VPN routing table of the VPN instance of the first CE device.

Optionally, in this embodiment of the present invention, the processor 510 is configured to: obtain, from the forwarding device, attribute information of the VPN instance of the first CE device, where the attribute information includes a VPN instance name, a VPN instance route distinguisher RD, a VPN instance route target RT, a VPN instance index value, and VPN instance interface information; and allocate a mapping identifier to the attribute information of the VPN instance of the first CE device, where the mapping identifier uniquely indicates, in the forwarding device, the attribute information of the VPN instance of the first CE device. The transmitter 550 is configured to send a mapping table to the forwarding device, where the mapping table includes a mapping relationship between the attribute information of the VPN instance of the first CE device and the mapping identifier. The GID carried in the GID field is one or more mapping identifiers.

Optionally, in this embodiment of the present invention, the processor 510 is configured to: obtain a VPN service request used to request to configure attribute information for a VPN instance that is of a third CE device and that is newly established on the forwarding device, and configure the following attribute information for the VPN instance of the third CE device: a VPN instance name, a VPN instance RD, a VPN instance RT, and VPN instance interface information, where the following attribute information of the VPN instance of the third CE device does not conflict with the attribute information corresponding to the VPN instance of the first CE device: the VPN instance name, the VPN instance RD, and the VPN instance interface information.

Optionally, in this embodiment of the present invention, a VPN instance of the second CE device is established on the forwarding device, and a VPN routing table of the VPN instance of the second CE device includes the routing information of the second CE device.

The characteristic information of the first resource is at least one piece of the following attribute information of the VPN instance of the second CE device: a VPN instance name, a VPN instance RD, a VPN instance index value, VPN instance interface information, or a VPN instance GID.

Optionally, in this embodiment of the present invention, a VPN instance of the second CE device is not established on the forwarding device, and a VPN public-network routing table of the forwarding device includes the routing information of the second CE device.

The characteristic information of the first resource is at least one piece of the following information: RD information, export target Export Target information, or route prefix information that is corresponding to the routing information of the second CE device.

Optionally, in this embodiment of the present invention, the forwarding device is a provider edge PE device. A virtual private network VPN instance of a first customer edge CE device and a VPN instance of a third CE device are established on the forwarding device. The forwarding device further includes routing information of a second CE device, a VPN routing table of the VPN instance of the first CE device does not include the routing information of the second CE device, and a VPN routing table of the VPN instance of the third CE device includes the routing information of the second CE device. The processor 510 is configured to: obtain a VPN service request, where the VPN service request is used to request the first CE device to access the second CE device; and obtain, according to the VPN service request, the requirement indicating that the first resource needs to be associated with the second resource, where a source IP address of the first resource is an IP address of the first CE device, a destination IP address of the first resource is an IP address of the second CE device, and the second resource is the VPN instance of the third CE device. The transmitter 550 is configured to send the BGP Flow Spec protocol packet to the forwarding device according to the requirement, where the flag filed in the BGP Flow Spec protocol packet is used to instruct to associate the first resource with the second resource on the forwarding plane, and the BGP Flow Spec protocol packet is used to instruct to forward, according to the routing information that is of the second CE device and that is included in the VPN routing table of the VPN instance of the third CE device, a data packet whose source IP address and destination IP address are consistent with those of the first resource.

Optionally, in this embodiment of the present invention, the second CE device is the third CE device.

It should be understood that in this embodiment of the present invention, the processor 510 may be a central processing unit (Central Processing Unit, "CPU" for short), or the processor 510 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any normal processor, or the like.

The memory 520 may include a read-only memory and a random access memory, and provide an instruction and data for the processor 510. A part of the memory 520 may further include a non-volatile random access memory. For example, the memory 520 may further store information about a device type.

In addition to a data bus, the bus system 530 may include a power bus, a control bus, a status signal bus, and the like. However, for clear description, various buses in the figure are marked as the bus system 530.

In an implementation process, the steps in the foregoing method may be completed by using an integrated logic circuit of hardware in the processor 510 or an instruction in a form of software. The steps of the method disclosed with reference to the embodiment of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically-erasable programmable memory, or a register. The storage medium is located in the memory 520. The processor 510 reads information from the memory 520, and completes the steps in the foregoing method in combination with hardware in the processor 510. To avoid repetition, details are not described herein again.

It should be understood that the controller 500 in this embodiment of the present invention may be corresponding to a controller in a Flow Spec-based communication method in an embodiment of the present invention, and may be corresponding to the controller 300 in an embodiment of the present invention. In addition, the foregoing and other operations and/or functions of the modules of the controller 500 are separately used to implement corresponding procedures of methods in FIG. 1 to FIG. 5. For brevity, details are not described herein again.

Figure 9:
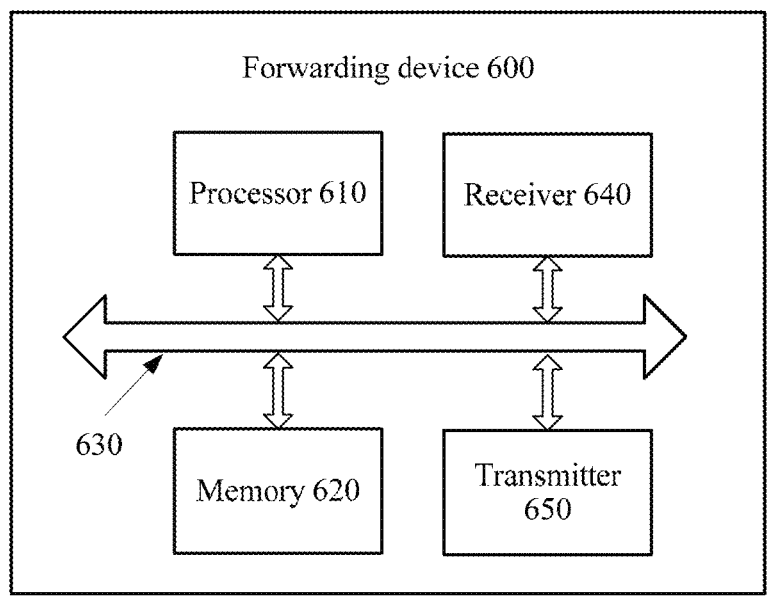
FIG. 9 is another schematic block diagram of a forwarding device according to an embodiment of the present invention.

As shown in FIG. 9, an embodiment of the present invention further provides a forwarding device 600. The forwarding device 600 includes a processor 610, a memory 620, a bus system 630, a receiver 640, and a transmitter 650. The processor 610, the memory 620, the receiver 640, and the transmitter 650 are connected to each other by using the bus system 630. The memory 620 is configured to store an instruction. The processor 610 is configured to execute the instruction stored in the memory 620, to control the receiver 640 to receive a signal and control the transmitter 650 to send a signal. The receiver 640 is configured to receive a Border Gateway Protocol Flow Specification BGP Flow Spec protocol packet sent by a controller, where the BGP Flow Spec protocol packet includes a network layer reachability information field and an extended community attribute field, the network layer reachability information field carries characteristic information, of a first resource, that is used to indicate the first resource on the forwarding device, the extended community attribute field carries a global identifier GID used to indicate a second resource on the forwarding device, and the BGP Flow Spec protocol packet is used to instruct to associate the first resource with the second resource. The processor 610 is configured to: obtain the first resource according to the characteristic information of the first resource, and obtain the first resource according to the GID. The forwarding device associates the first resource with the second resource.

Therefore, in this embodiment of the present invention, the network layer reachability information field in the BGP Flow Spec protocol packet carries the characteristic information of the first resource, and the extended community attribute field carries the global identifier GID used to indicate the second resource, so as to instruct the forwarding device to associate the first resource with the second resource, to guide a data flow to enter a corresponding forwarding channel. Compared with a conventional technology, the BGP Flow Spec protocol in this application may meet a plurality of service requirements by using a unified packet format, so as to effectively avoid unlimited extension of an extended community attribute in the BGP Flow Spec protocol. In addition, the second resource can be indicated by adding the concise GID to the extended community attribute field in the BGP Flow Spec protocol packet. In this way, signaling overheads can be reduced.

Optionally, in this embodiment of the present invention, the extended community attribute field includes a GID field and a flag field, the GID field carries the GID, and the flag filed carries information used to instruct to associate the first resource with the second resource on a control plane of the forwarding device or on a forwarding plane of the forwarding device.

Optionally, in this embodiment of the present invention, the flag filed includes a forwarding plane bit and a control plane bit. When 0 is assigned to the forwarding plane bit and 1 is assigned to the control plane bit, it indicates that the first resource is to be associated with the second resource on the control plane, and when 1 is assigned to the forwarding plane bit and 0 is assigned to the control plane bit, it indicates that the first resource is to be associated with the second resource on the forwarding plane.

Optionally, in this embodiment of the present invention, the forwarding device 600 is a provider edge PE device. A virtual private network VPN instance of a first customer edge CE device is established on the forwarding device. The forwarding device includes routing information of a second CE device, and the routing information of the second CE device is not in a VPN routing table of the VPN instance of the first CE device. The receiver 640 is configured to receive the BGP Flow Spec protocol packet sent by the controller according to a VPN service request, where the VPN service request is used to request the first CE device to access the second CE device, the first resource is the routing information of the second CE device, the second resource is the VPN instance of the first CE device, the flag filed in the BGP Flow Spec protocol packet is used to instruct to associate the first resource with the second resource on the control plane, and the BGP Flow Spec protocol packet is used to instruct to add the routing information of the second CE device to the VPN routing table of the VPN instance of the first CE device.

The processor 610 is configured to add the routing information of the second CE device to the VPN routing table of the VPN instance of the first CE device.

Optionally, in this embodiment of the present invention, the transmitter 650 is configured to send attribute information of the VPN instance of the first CE device to the controller, where the attribute information includes a VPN instance name, a VPN instance route distinguisher RD, a VPN instance route target RT, a VPN instance index value, and VPN instance interface information. The receiver 640 is configured to receive a mapping table sent by the controller, where the mapping table includes a mapping relationship between the attribute information of the VPN instance of the first CE device and a mapping identifier that is allocated by the controller to the attribute information of the VPN instance of the first CE device, and the mapping identifier uniquely indicates, in the forwarding device, the attribute information of the VPN instance of the first CE device. The GID carried in the GID field is one or more mapping identifiers.

Optionally, in this embodiment of the present invention, a VPN instance of the second CE device is established on the forwarding device 600, and a VPN routing table of the VPN instance of the second CE device includes the routing information of the second CE device.

The characteristic information of the first resource is at least one piece of the following attribute information of the VPN instance of the second CE device: a VPN instance name, a VPN instance RD, a VPN instance index value, VPN instance interface information, or a VPN instance GID.

The processor 610 is configured to obtain, from the VPN routing table of the VPN instance of the second CE device, the routing information of the second CE device according to the characteristic information of the first resource.

Optionally, in this embodiment of the present invention, a VPN instance of the second CE device is not established on the forwarding device 600, and a VPN public-network routing table of the forwarding device includes the routing information of the second CE device.

The characteristic information of the first resource is at least one piece of the following information: RD information, export target Export Target information, or route prefix information that is corresponding to the routing information of the second CE device.

The processor 610 is configured to obtain, from the VPN public-network routing table, the routing information of the second CE device according to the characteristic information of the first resource.

Optionally, in this embodiment of the present invention, the forwarding device 600 is a provider edge PE device. A virtual private network VPN instance of a first customer edge CE device and a VPN instance of a third CE device are established on the forwarding device. The forwarding device further includes routing information of a second CE device, a VPN routing table of the VPN instance of the first CE device does not include the routing information of the second CE device, and a VPN routing table of the VPN instance of the third CE device includes the routing information of the second CE device. The receiver 640 is configured to receive the BGP Flow Spec protocol packet sent by the controller according to a VPN service request, where the VPN service request is used to request the first CE device to access the second CE device, a source IP address of the first resource is an IP address of the first CE device, a destination IP address of the first resource is an IP address of the second CE device, the second resource is the VPN instance of the third CE device, the flag filed in the BGP Flow Spec protocol packet is used to instruct to associate the first resource with the second resource on the forwarding plane, and the BGP Flow Spec protocol packet is used to instruct to forward, according to the routing information that is of the second CE device and that is included in the VPN routing table of the VPN instance of the third CE device, a data packet whose source IP address and destination IP address are consistent with those of the first resource.

The receiver 640 is configured to receive the data packet, where the source IP address of the data packet is the IP address of the first CE device, and the destination IP address of the data packet is the IP address of the second CE device.

The processor 610 is configured to forward the data packet according to the routing information that is of the second CE device and that is included in the VPN routing table of the VPN instance of the third CE device.

Optionally, in this embodiment of the present invention, the second CE device is the third CE device.

It should be understood that in this embodiment of the present invention, the processor 610 may be a central processing unit (Central Processing Unit, "CPU" for short), or the processor 610 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any normal processor, or the like.

The memory 620 may include a read-only memory and a random access memory, and provide an instruction and data for the processor 610. A part of the memory 620 may further include a non-volatile random access memory. For example, the memory 620 may further store information about a device type.

In addition to a data bus, the bus system 630 may include a power bus, a control bus, a status signal bus, and the like. However, for clear description, various buses in the figure are marked as the bus system 630.

In an implementation process, the steps in the foregoing method may be completed by using an integrated logic circuit of hardware in the processor 610 or an instruction in a form of software. The steps of the method disclosed with reference to the embodiment of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically-erasable programmable memory, or a register. The storage medium is located in the memory 620. The processor 610 reads information from the memory 620, and completes the steps in the foregoing method in combination with hardware in the processor 610. To avoid repetition, details are not described herein again.

It should be understood that the forwarding device 600 in this embodiment of the present invention may be corresponding to a forwarding device in a Flow Spec-based communication method in an embodiment of the present invention, and may be corresponding to the forwarding device 400 in an embodiment of the present invention. In addition, the foregoing and other operations and/or functions of the modules of the forwarding device 600 are separately used to implement corresponding procedures of methods in FIG. 1 to FIG. 5. For brevity, details are not described herein again.

Figure 10:
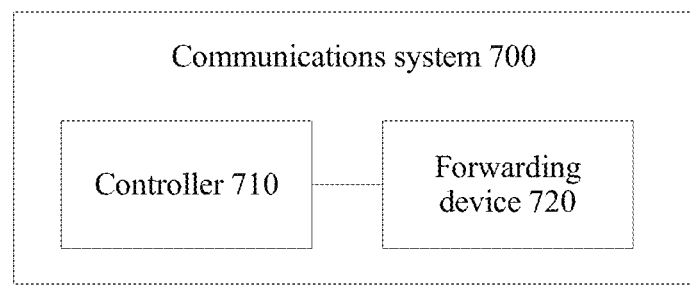
FIG. 10 is a schematic block diagram of a Flow Specification Flow Spec-based communications system according to an embodiment of the present invention.

As shown in FIG. 10, an embodiment of the present invention further provides a Flow Specification Flow Spec-based communications system 700. The communications system 700 includes a controller 710 and a forwarding device 720. The controller 710 is corresponding to the controller 300 in an embodiment of the present invention, and the forwarding device 720 is corresponding to the forwarding device 400 in an embodiment of the present invention.

Therefore, in this embodiment of the present invention, a network layer reachability information field in a BGP Flow Spec protocol packet carries characteristic information of a first resource, and an extended community attribute field carries a global identifier GID used to indicate a second resource, so as to instruct the forwarding device to associate the first resource with the second resource, to guide a data flow to enter a corresponding forwarding channel. Compared with a conventional technology, the BGP Flow Spec protocol in this application may meet a plurality of service requirements by using a unified packet format, so as to effectively avoid unlimited extension of an extended community attribute in the BGP Flow Spec protocol. In addition, the second resource can be indicated by adding the concise GID to the extended community attribute field in the BGP Flow Spec protocol packet. In this way, signaling overheads can be reduced.

It should be further understood that numerical symbols included in this specification are differentiated merely for ease of description, but are not used to limit the scope of the embodiments of the present invention.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the communication methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A Flow Specification protocol-based communication method, comprising:
   obtaining, by a controller, a requirement indicating that a first resource on a forwarding device needs to be associated with a second resource on the forwarding device; and
   sending, by the controller, a Border Gateway Protocol Flow Specification (BGP) Flow Spec protocol packet to the forwarding device according to the requirement, wherein the BGP Flow Spec protocol packet comprises a network layer reachability information field and an extended community attribute field, the network layer reachability information field carries characteristic information of the first resource, the extended community attribute field carries a global identifier (GID) used to indicate the second resource, and the BGP Flow Spec protocol packet is used to instruct to associate the first resource with the second resource.

2. The communication method according to claim 1, wherein the extended community attribute field comprises a GID field and a flag field, the GID field carries the GID, and the flag filed carries information used to instruct to associate the first resource with the second resource on a control plane of the forwarding device or on a forwarding plane of the forwarding device.

3. The communication method according to claim 2, wherein the flag filed comprises a forwarding plane bit and a control plane bit; and when 0 is assigned to the forwarding plane bit and 1 is assigned to the control plane bit, it indicates that the first resource is to be associated with the second resource on the control plane, and when 1 is assigned to the forwarding plane bit and 0 is assigned to the control plane bit, it indicates that the first resource is to be associated with the second resource on the forwarding plane.

4. The communication method according to claim 2, wherein the forwarding device is a provider edge PE device, a virtual private network (VPN) instance of a first customer edge (CE) device is established on the forwarding device, and routing information of a second CE device is not in a VPN routing table of the VPN instance of the first CE device; and the communication method further comprises:
   obtaining, by the controller, a VPN service request, wherein the VPN service request is used to request the first CE device to access the second CE device;
   the obtaining, by the controller, a requirement indicating that the first resource on the forwarding device needs to be associated with the second resource on the forwarding device comprises:
   obtaining, by the controller according to the VPN service request, the requirement indicating that the first resource needs to be associated with the second resource, wherein the first resource is the routing information of the second CE device, and the second resource is the VPN instance of the first CE device; and the sending, by the controller, a Border Gateway Protocol Flow Specification (BGP) Flow Spec protocol packet to the forwarding device according to the requirement comprises:

sending, by the controller, the BGP Flow Spec protocol packet to the forwarding device according to the requirement, wherein the flag filed in the BGP Flow Spec protocol packet is used to instruct to associate the first resource with the second resource on the control plane, and the BGP Flow Spec protocol packet is used to instruct to add the routing information of the second CE device to the VPN routing table of the VPN instance of the first CE device.

5. The communication method according to claim 4, wherein the communication method further comprises:

obtaining, by the controller from the forwarding device, attribute information of the VPN instance of the first CE device, wherein the attribute information comprises a VPN instance name, a VPN instance route distinguisher (RD), a VPN instance route target RT, a VPN instance index value, and VPN instance interface information;

allocating, by the controller, a mapping identifier to the attribute information of the VPN instance of the first CE device, wherein the mapping identifier uniquely indicates, in the forwarding device, the attribute information of the VPN instance of the first CE device; and sending, by the controller, a mapping table to the forwarding device, wherein the mapping table comprises a mapping relationship between the attribute information of the VPN instance of the first CE device and the mapping identifier, wherein the GID carried in the GID field is one or more mapping identifiers.

6. The communication method according to claim 5, wherein the communication method further comprises:

obtaining, by the controller, a VPN service request used to request to configure attribute information for a VPN instance that is of a third CE device and that is newly established on the forwarding device; and configuring, by the controller, the following attribute information for the VPN instance of the third CE device: a VPN instance name, a VPN instance RD, a VPN instance RT, and VPN instance interface information, wherein the following attribute information of the VPN instance of the third CE device does not conflict with the attribute information corresponding to the VPN instance of the first CE device: the VPN instance name, the VPN instance RD, and the VPN instance interface information.

7. The communication method according to claim 4, wherein a VPN instance of the second CE device is established on the forwarding device, and a VPN routing table of the VPN instance of the second CE device comprises the routing information of the second CE device; and the characteristic information of the first resource is at least one piece of the following attribute information of the VPN instance of the second CE device: a VPN instance name, a VPN instance RD, a VPN instance index value, VPN instance interface information, or a VPN instance GID.

8. The communication method according to claim 4, wherein a VPN instance of the second CE device is not established on the forwarding device, and a VPN public-network routing table of the forwarding device comprises the routing information of the second CE device; and the characteristic information of the first resource is at least one piece of the following information: RD information, export target information, or route prefix information that is corresponding to the routing information of the second CE device.

9. A Flow Specification protocol-based communication method, comprising:

receiving, by a forwarding device, a Border Gateway Protocol Flow Specification BGP Flow Spec protocol packet sent by a controller, wherein the BGP Flow Spec protocol packet comprises a network layer reachability information field and an extended community attribute field, the network layer reachability information field carries characteristic information, of a first resource, that is used to indicate the first resource on the forwarding device, the extended community attribute field carries a global identifier GID used to indicate a second resource on the forwarding device, and the BGP Flow Spec protocol packet is used to instruct to associate the first resource with the second resource;

obtaining, by the forwarding device, the first resource according to the characteristic information of the first resource, and obtaining the second resource according to the GID; and associating, by the forwarding device, the first resource with the second resource.

10. The communication method according to claim 9, wherein the extended community attribute field comprises a GID field and a flag field, the GID field carries the GID, and the flag filed carries information used to instruct to associate the first resource with the second resource on a control plane of the forwarding device or on a forwarding plane of the forwarding device.

11. The communication method according to claim 10, wherein the flag filed comprises a forwarding plane bit and a control plane bit; and when 0 is assigned to the forwarding plane bit and 1 is assigned to the control plane bit, it indicates that the first resource is to be associated with the second resource on the control plane, and when 1 is assigned to the forwarding plane bit and 0 is assigned to the control plane bit, it indicates that the first resource is to be associated with the second resource on the forwarding plane.

12. The communication method according to claim 10, wherein the forwarding device is a provider edge PE device, a virtual private network VPN instance of a first customer edge CE device is established on the forwarding device, and routing information of the second CE device is not in a VPN routing table of the VPN instance of the first CE device; and the receiving, by a forwarding device, a BGP Flow Spec protocol packet sent by the controller comprises:

receiving, by the forwarding device, the BGP Flow Spec protocol packet sent by the controller according to a VPN service request, wherein the VPN service request is used to request the first CE device to access the second CE device, the first resource is the routing information of the second CE device, the second resource is the VPN instance of the first CE device, the flag filed in the BGP Flow Spec protocol packet is used to instruct to associate the first resource with the second resource on the control plane, and the BGP Flow Spec protocol packet is used to instruct to add the routing information of the second CE device to the VPN routing table of the VPN instance of the first CE device; and the associating, by the forwarding device, the first resource with the second resource comprises:
adding, by the forwarding device, the routing information of the second CE device to the VPN routing table of the VPN instance of the first CE device.

13. The communication method according to claim 12, wherein the communication method further comprises:
sending, by the forwarding device, attribute information of the VPN instance of the first CE device to the controller, wherein the attribute information comprises a VPN instance name, a VPN instance route distinguisher RD, a VPN instance route target RT, a VPN instance index value, and VPN instance interface information; and
receiving, by the forwarding device, a mapping table sent by the controller, wherein the mapping table comprises a mapping relationship between the attribute information of the VPN instance of the first CE device and a mapping identifier that is allocated by the controller to the attribute information of the VPN instance of the first CE device, and the mapping identifier uniquely indicates, in the forwarding device, the attribute information of the VPN instance of the first CE device, wherein the GID carried in the GID field is one or more mapping identifiers.

14. The communication method according to claim 12, wherein a VPN instance of the second CE device is established on the forwarding device, and a VPN routing table of the VPN instance of the second CE device comprises the routing information of the second CE device;
the characteristic information of the first resource is at least one piece of the following attribute information of the VPN instance of the second CE device: a VPN instance name, a VPN instance RD, a VPN instance index value, VPN instance interface information, or a VPN instance GID; and
the obtaining, by the forwarding device, the first resource according to the characteristic information of the first resource comprises:
obtaining, by the forwarding device from the VPN routing table of the VPN instance of the second CE device, the routing information of the second CE device according to the characteristic information of the first resource.

15. The communication method according to claim 12, wherein a VPN instance of the second CE device is not established on the forwarding device, and a VPN public-network routing table of the forwarding device comprises the routing information of the second CE device;
the characteristic information of the first resource is at least one piece of the following information: RD information, export target information, or route prefix information that is corresponding to the routing information of the second CE device; and
the obtaining, by the forwarding device, the first resource according to the characteristic information of the first resource comprises:
obtaining, by the forwarding device from the VPN public-network routing table, the routing information of the second CE device according to the characteristic information of the first resource.

16. A controller, comprising:
an obtaining module, configured to obtain a requirement indicating that a first resource on a forwarding device needs to be associated with a second resource on the forwarding device; and
a sending module, configured to send a Border Gateway Protocol Flow Specification BGP Flow Spec protocol packet to the forwarding device according to the requirement obtained by the obtaining module, wherein the BGP Flow Spec protocol packet comprises a network layer reachability information field and an extended community attribute field, the network layer reachability information field carries characteristic information of the first resource, the extended community attribute field carries a global identifier GID used to indicate the second resource, and the BGP Flow Spec protocol packet is used to instruct to associate the first resource with the second resource.

17. The controller according to claim 16, wherein the extended community attribute field comprises a GID field and a flag field, the GID field carries the GID, and the flag filed carries information used to instruct to associate the first resource with the second resource on a control plane of the forwarding device or on a forwarding plane of the forwarding device.

18. The controller according to claim 17, wherein the flag filed comprises a forwarding plane bit and a control plane bit; and when 0 is assigned to the forwarding plane bit and 1 is assigned to the control plane bit, it indicates that the first resource is to be associated with the second resource on the control plane, and when 1 is assigned to the forwarding plane bit and 0 is assigned to the control plane bit, it indicates that the first resource is to be associated with the second resource on the forwarding plane.

19. The controller according to claim 17, wherein the forwarding device is a provider edge PE device, a virtual private network VPN instance of a first customer edge CE device is established on the forwarding device, and routing information of a second CE device is not in a VPN routing table of the VPN instance of the first CE device; and the obtaining module is configured to: obtain a VPN service request, wherein the VPN service request is used to request the first CE device to access the second CE device; and obtain, according to the VPN service request, the requirement indicating that the first resource needs to be associated with the second resource, wherein the first resource is the routing information of the second CE device, and the second resource is the VPN instance of the first CE device; and
the sending module is configured to send the BGP Flow Spec protocol packet to the forwarding device according to the requirement, wherein the flag filed in the BGP Flow Spec protocol packet is used to instruct to associate the first resource with the second resource on the control plane, and the BGP Flow Spec protocol packet is used to instruct to add the routing information of the second CE device to the VPN routing table of the VPN instance of the first CE device.

20. The controller according to claim 19, wherein
the obtaining module is further configured to obtain, from the forwarding device, attribute information of the VPN instance of the first CE device, wherein the attribute information comprises a VPN instance name, a VPN instance route distinguisher RD, a VPN instance route target RT, a VPN instance index value, and VPN instance interface information;
the controller further comprises:
an identifier allocation module, configured to allocate a mapping identifier to the attribute information of the VPN instance of the first CE device, wherein the mapping identifier uniquely indicates, in the forwarding device, the attribute information of the VPN instance of the first CE device; and
the sending module is further configured to send a mapping table to the forwarding device, wherein the mapping table comprises a mapping relationship between the attribute information of the VPN instance of the first CE device and the mapping identifier, wherein the GID carried in the GID field is one or more mapping identifiers.

21. The controller according to claim 20, wherein the obtaining module is further configured to obtain a VPN service request used to request to configure attribute information for a VPN instance that is of a third CE device and that is newly established on the forwarding device; and the controller further comprises:

a VPN instance configuration module, configured to configure the following attribute information for the VPN instance of the third CE device: a VPN instance name, a VPN instance RD, a VPN instance RT, and VPN instance interface information, wherein the following attribute information of the VPN instance of the third CE device does not conflict with the attribute information corresponding to the VPN instance of the first CE device: the VPN instance name, the VPN instance RD, and the VPN instance interface information.

22. A forwarding device, comprising:

a receiving module, configured to receive a Border Gateway Protocol Flow Specification BGP Flow Spec protocol packet sent by a controller, wherein the BGP Flow Spec protocol packet comprises a network layer reachability information field and an extended community attribute field, the network layer reachability information field carries characteristic information, of a first resource, that is used to indicate the first resource on the forwarding device, the extended community attribute field carries a global identifier GID used to indicate a second resource on the forwarding device, and the BGP Flow Spec protocol packet is used to instruct to associate the first resource with the second resource;

an obtaining module, configured to: obtain the first resource according to the characteristic information that is of the first resource and that is received by the receiving module, and obtain the second resource according to the GID; and an association module, configured to associate the first resource with the second resource according to the BGP Flow Spec protocol packet received by the receiving module.

23. The forwarding device according to claim 22, wherein the extended community attribute field comprises a GID field and a flag field, the GID field carries the GID, and the flag filed carries information used to instruct to associate the first resource with the second resource on a control plane of the forwarding device or on a forwarding plane of the forwarding device.

24. The forwarding device according to claim 23, wherein the flag filed comprises a forwarding plane bit and a control plane bit; and when 0 is assigned to the forwarding plane bit and 1 is assigned to the control plane bit, it indicates that the first resource is to be associated with the second resource on the control plane, and when 1 is assigned to the forwarding plane bit and 0 is assigned to the control plane bit, it indicates that the first resource is to be associated with the second resource on the forwarding plane.

25. A controller, comprising: a processor and a memory; the memory is configured to store an instruction; the processor is configured to execute the instruction stored in the memory to cause the controller to:

obtain a requirement indicating that a first resource on a forwarding device needs to be associated with a second resource on the forwarding device;

send a Border Gateway Protocol Flow Specification (BGP) Flow Spec protocol packet to the forwarding device according to the requirement, wherein the BGP Flow Spec protocol packet comprises a network layer reachability information field and an extended community attribute field, the network layer reachability information field carries characteristic information of the first resource, the extended community attribute field carries a global identifier (GID) used to indicate the second resource, and the BGP Flow Spec protocol packet is used to instruct to associate the first resource with the second resource.

26. A forwarding device, comprising: a processor and a memory;

the memory is configured to store an instruction;

the processor is configured to execute the instruction stored in the memory to cause the forwarding device to:

receive a Border Gateway Protocol Flow Specification (BGP) Flow Spec protocol packet sent by a controller, wherein the BGP Flow Spec protocol packet comprises a network layer reachability information field and an extended community attribute field, the network layer reachability information field carries characteristic information, of a first resource, that is used to indicate the first resource on the forwarding device, the extended community attribute field carries a global identifier GID used to indicate a second resource on the forwarding device, and the BGP Flow Spec protocol packet is used to instruct to associate the first resource with the second resource;

obtain the first resource according to the characteristic information of the first resource, and obtaining the second resource according to the GID; and associate the first resource with the second resource.

27. A communications system, comprising: a controller and a forwarding device;

the controller is configured to obtain a requirement indicating that a first resource on a forwarding device needs to be associated with a second resource on the forwarding device, and send a Border Gateway Protocol Flow Specification (BGP) Flow Spec protocol packet to the forwarding device according to the requirement, wherein the BGP Flow Spec protocol packet comprises a network layer reachability information field and an extended community attribute field, the network layer reachability information field carries characteristic information of the first resource, the extended community attribute field carries a global identifier (GID) used to indicate the second resource, and the BGP Flow Spec protocol packet is used to instruct to associate the first resource with the second resource;

the forwarding device is configured to receive the BGP Flow Spec protocol packet sent by the controller, obtain the first resource according to the characteristic information of the first resource, and obtaining the second resource according to the GID, and associate the first resource with the second resource.

* * * * *